United States Patent
Tanibata

(10) Patent No.: US 11,640,358 B2
(45) Date of Patent: May 2, 2023

(54) VEHICULAR DEVICE AND CONTROL METHOD FOR VEHICULAR DEVICE

(71) Applicant: DENSO CORPORATION, Kariya (JP)

(72) Inventor: Nobuhiko Tanibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 32 days.

(21) Appl. No.: 17/498,885

(22) Filed: Oct. 12, 2021

(65) Prior Publication Data

US 2022/0027276 A1  Jan. 27, 2022

Related U.S. Application Data

(63) Continuation of application No. PCT/JP2020/014558, filed on Mar. 30, 2020.

(30) Foreign Application Priority Data

Apr. 16, 2019 (JP) .............................. JP2019-077776

(51) Int. Cl.
*G06F 12/0844* (2016.01)

(52) U.S. Cl.
CPC ...... *G06F 12/0844* (2013.01); *G06F 2212/60* (2013.01)

(58) Field of Classification Search
None
See application file for complete search history.

(56) References Cited

U.S. PATENT DOCUMENTS

| | | |
|---|---|---|
| 2014/0049548 A1 | 2/2014 | Rao et al. |
| 2014/0049551 A1 | 2/2014 | Rao et al. |
| 2016/0328823 A1 | 11/2016 | Rao et al. |
| 2017/0294176 A1 | 10/2017 | Ito |
| 2018/0174349 A1 | 6/2018 | Yang et al. |
| 2019/0121735 A1* | 4/2019 | Hamaker ............ G06F 12/0802 |
| 2020/0219223 A1* | 7/2020 | Vembu .................. G06F 9/5061 |

FOREIGN PATENT DOCUMENTS

| | | |
|---|---|---|
| JP | 2001075917 A | 3/2001 |
| JP | 2016097928 A | 5/2016 |
| JP | 2017523499 A | 8/2017 |
| JP | 2017191145 A | 10/2017 |
| JP | 2017208124 A | 11/2017 |
| JP | 2018139128 A | 9/2018 |

OTHER PUBLICATIONS

U.S. Appl. No. 17/498,823, filed Oct. 12, 2021, Tanibata.
U.S. Appl. No. 17/498,930, filed Oct. 12, 2021, Tanibata.

* cited by examiner

*Primary Examiner* — Yaima Rigol
(74) *Attorney, Agent, or Firm* — Harness, Dickey & Pierce, P.L.C.

(57) ABSTRACT

A vehicular device includes multiple CPU modules, multiple cache memories allocated to the CPU modules, respectively, and a memory synchronization unit configured to synchronize multiple surfaces drawn in the multiple cache memories. The memory synchronization unit divides the surfaces to be synchronized into multiple tiles, and sequentially synchronize the divided tiles from tiles for which drawing has been completed.

7 Claims, 21 Drawing Sheets

PHYSICAL SURFACE (A)
(METER APPLICATION)

PHYSICAL SURFACE (B)
(NAVIGATION APPLICATION)

PHYSICAL SURFACE (C)
(SAFETY APPLICATION)

PHYSICAL SURFACE (D)
(VIDEO APPLICATION)

PHYSICAL SURFACE (E)
(HUD APPLICATION)

COMPARATIVE EXAMPLE: SEQUENCE

COMPARATIVE EXAMPLE: SCREEN TRANSITION

VEHICULAR DEVICE AND CONTROL METHOD FOR VEHICULAR DEVICE

CROSS REFERENCE TO RELATED APPLICATIONS

The present application is a continuation application of International Patent Application No. PCT/JP2020/014558 filed on Mar. 30, 2020, which designated the U.S. and claims the benefit of priority from Japanese Patent Application No. 2019-077776 filed on Apr. 16, 2019. The entire disclosures of all of the above applications are incorporated herein by reference.

TECHNICAL FIELD

The present disclosure relates to a vehicular device and a control method for a vehicular device.

BACKGROUND

In related arts, a display device provided in a vehicle is controlled by an individual device.

SUMMARY

The present disclosure provides a vehicular device and a control method for a vehicular device in which multiple surfaces to be drawn in multiple cache memories and to be synchronized are divided into multiple tiles, and the divided tiles are sequentially synchronized from tiles for which drawing has been completed.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
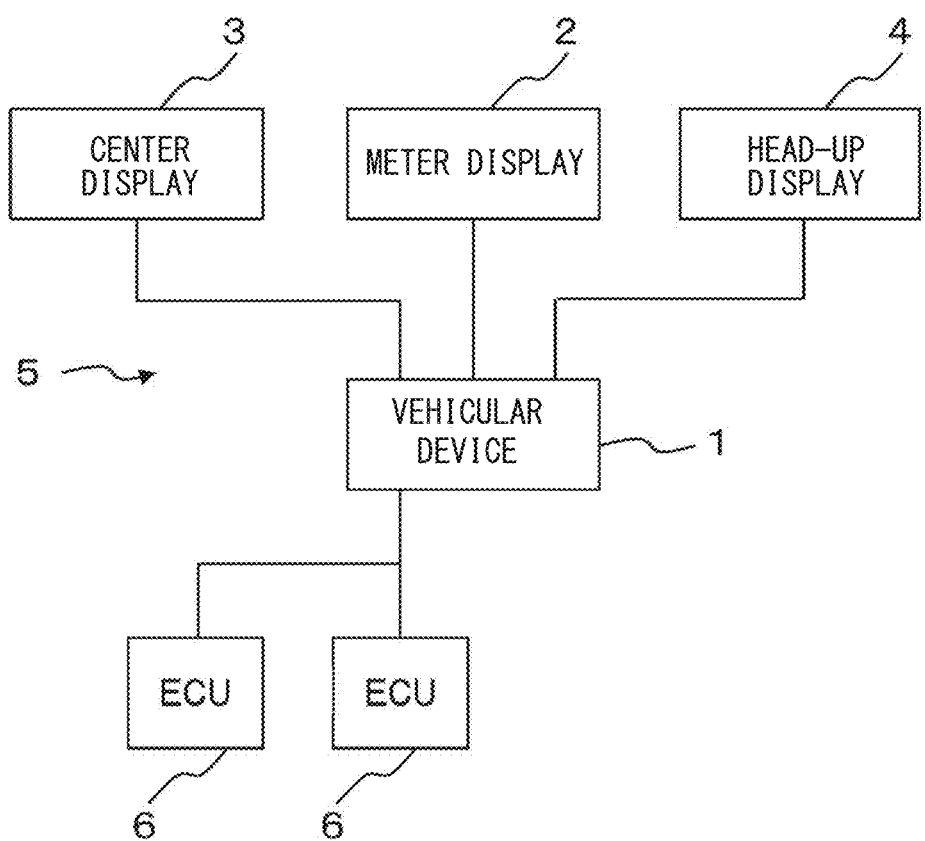
FIG. 1 is a diagram showing an example configuration of a cockpit system in a first embodiment.

A cockpit system in which multiple display devices are provided may be adopted in the vehicle. In this case, when the display devices are controlled by the individual device, there is a possibility that a seamless user interface cannot be implemented due to a limitation of a band between the devices, delay of synchronization, and the like. Therefore, by integrating control of the display devices into one vehicular device, the limitation of a band and the delay of synchronization described above are desired to be eliminated.

However, as a result of an integration of the control of the display devices into one vehicular device, an issue newly occurs in that a load on cache memories or a bus of the vehicular device increases. The issue becomes more remarkable as a size and a definition of the display device are increased.

For example, in a case of displaying multiple contents, it is necessary to share the contents across central processing unit (CPU) modules and operating systems, and it is expected that the load on the cache memories or the bus is further increased. Therefore, it is strongly required to reduce the load on the cache memories or the bus.

A vehicular device according to an aspect of the present disclosure includes multiple CPU modules, multiple cache memories allocated to the CPU modules, respectively, and a memory synchronization unit synchronizing multiple surfaces drawn in the multiple cache memories, respectively. The memory synchronization unit divides the surfaces to be synchronized into multiple tiles, and sequentially synchronize the divided tiles from tiles for which drawing has been completed. Accordingly, the process of synchronizing the cache memories is distributed, and the load on the cache memories or the bus can be reduced.

Hereinafter, a basic configuration, a use case, and a method for solving an issue occurring in the use case will be described in first to third embodiments, and then, methods for reducing a load on a cache memory or a bus will be described in fourth and fifth embodiments. The configurations that are substantially common in each embodiment will be described with the same reference numerals.

(First Embodiment)

A first embodiment will be described below. As shown in FIG. 1, a vehicular device 1 forms a cockpit system 5 with three displays, for example, a meter display 2, a center display 3, and a head-up display 4.

The meter display 2 includes, for example, a liquid crystal display or an organic EL display, and is assumed to be installed on a portion of a dashboard near a front of a driver. The center display 3 is, for example, a liquid crystal display or an organic EL display, and is assumed to be provided in the vicinity of a center console.

The head-up display 4 is, for example, a liquid crystal display, an organic EL display, or a projector that projects an image onto a front window, and is assumed to be provided in the vicinity of the front of the driver on the dashboard. However, the number, the arrangement, or the configuration of the display devices is merely an example, and the disclosure is not limited thereto.

Although FIG. 1 shows an example in which the vehicular device 1 is connected to multiple display devices, the vehicular device 1 according to the first embodiment is intended to synchronize surfaces in one user interface, as will be described later. Therefore, there need only be one or more displays connected to the vehicular device 1.

The vehicular device 1 is communicably connected to some electronic control devices 6 (hereinafter referred to as ECUs 6) provided in a vehicle. Although the vehicular device 1 can be considered as one of the ECUs 6, for ease of understanding, the vehicular device 1 and the ECUs 6 are separated in the present disclosure.

Figure 2:
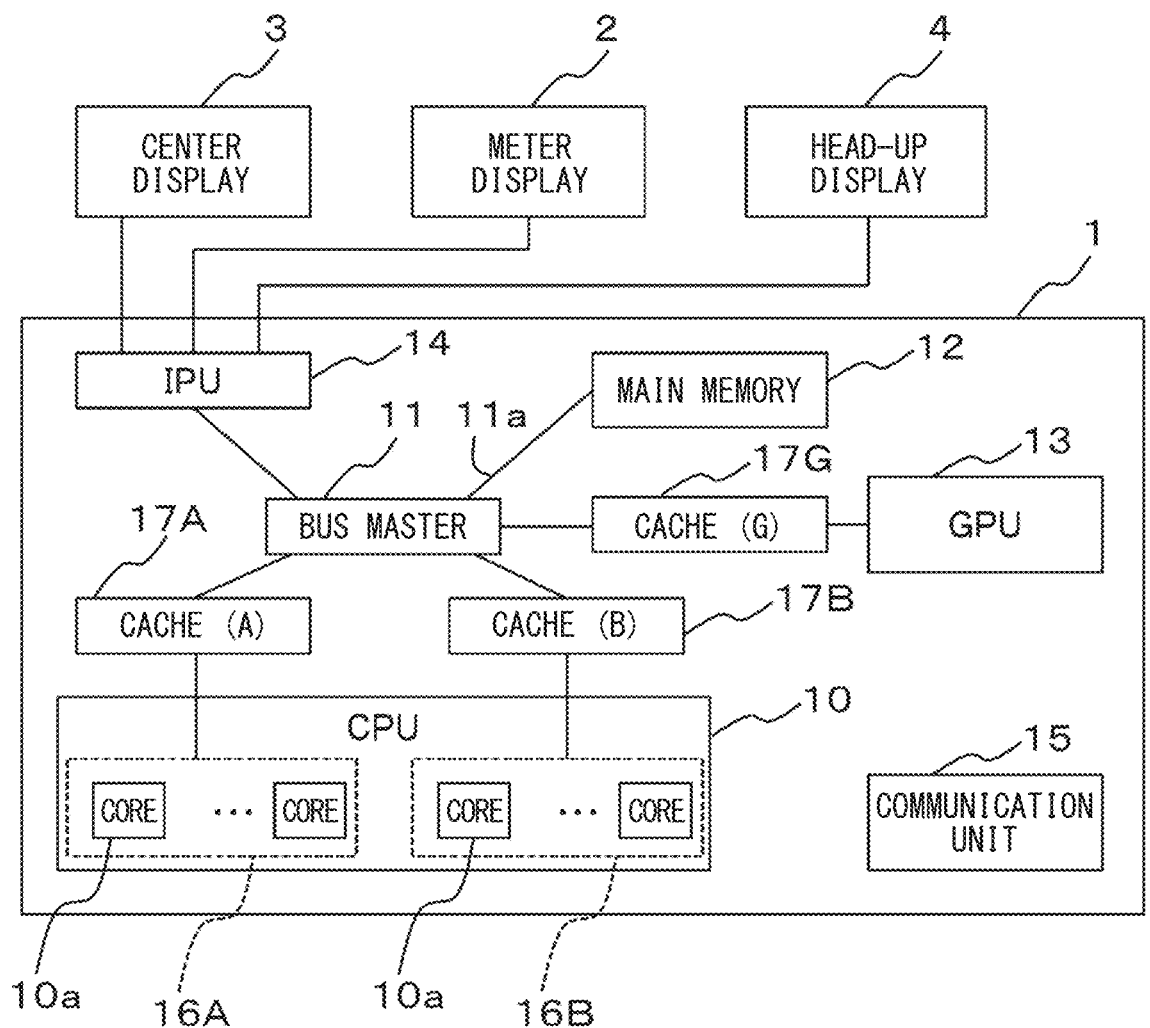
FIG. 2 is a diagram showing an example of an electrical configuration of a vehicular device.

As shown in FIG. 2, the vehicular device 1 includes a CPU 10, a bus master 11, a main memory 12, a graphics processing unit 13 (hereinafter referred to as GPU 13), an image processing unit 14 (hereinafter referred to as IPU 14), a communication unit 15, and the like.

The GPU 13 is a functional unit that actually draws a surface instructed by an application program, as described below. Note that the surface is, in brief, an image data that is a source of a content image displayed at a certain moment.

The IPU 14 is a functional unit that outputs the drawn surface as a video signal to each display.

The CPU 10 includes multiple cores 10a. Here, as an example, the number of cores 10a is eight. The eight cores 10a are grouped by each four cores, and are allocated to two CPU modules 16A and 16B. In other words, multiple CPU modules 16 that are capable of operating functionally independently are provided in the vehicular device 1.

The CPU module 16A is allocated to an application group 22A that relatively requires real-time property, and the CPU module 16B is allocated to an application group 22B that does not relatively require real-time property. Hereafter, when giving explanations common to CPU modules 16, they are referred to simply as the CPU modules 16 without adding A or B.

Each CPU module 16 and GPU 13 has a dedicated cache memory 17. Hereinafter, the cash memory provided for the CPU module 16A is referred to as a cache 17A for convenience, the cache memory provided for the CPU module 16B is referred to as a cache 17B for convenience, and the cache memory provided for the GPU 13 is referred to as a cache 17G for convenience. Each of the cache memories 17 is connected to the main memory 12 and the IPU 14 via a bus 11a and the bus master 11, and is configured to be able to transmit and receive data mutually.

The communication unit 15 performs communication with other ECUs 6. The communication unit 15 includes, for example, a controller area network interface. Depending on the type of the ECUs 6, a wireless communication method such as Wi-Fi, or a wired communication method such as USB may be employed.

Figure 3:
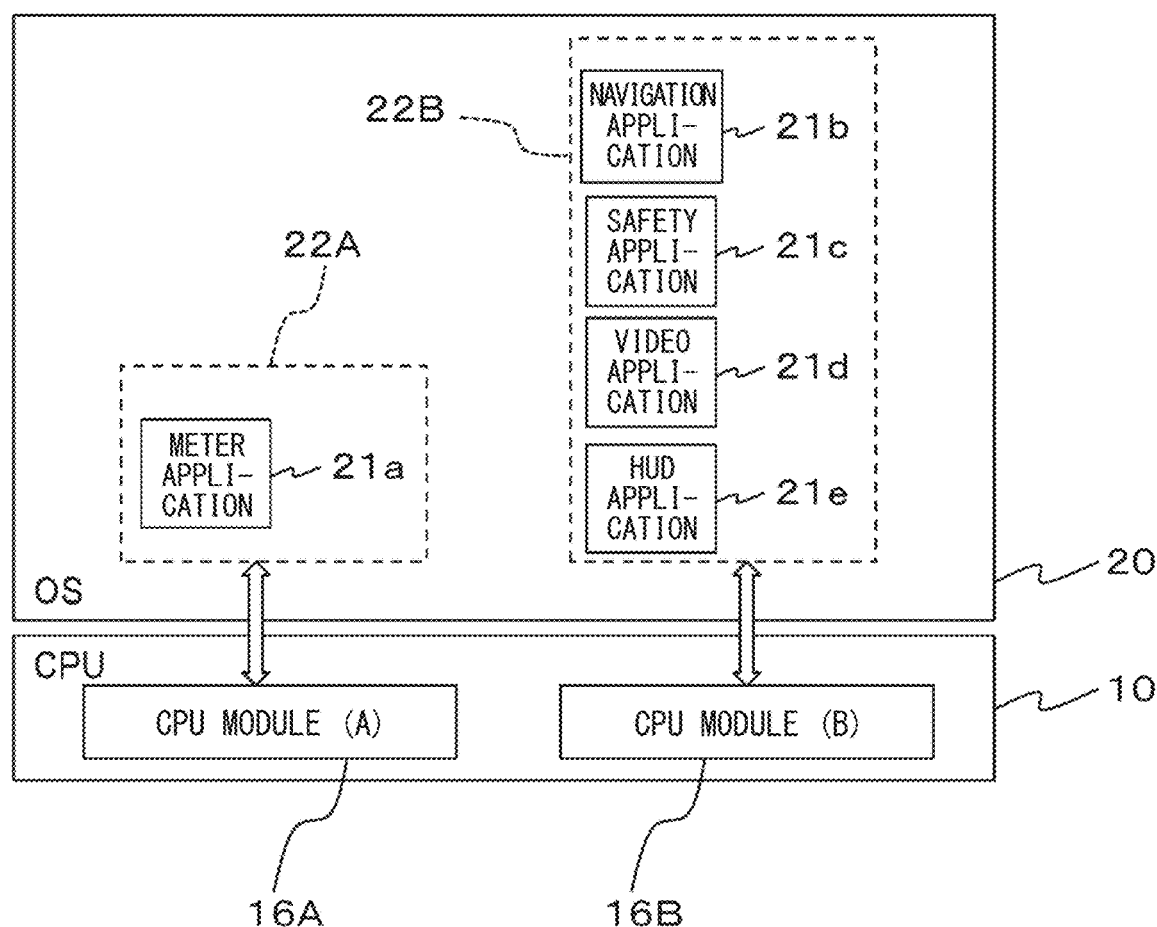
FIG. 3 is a diagram showing an example of a software configuration of the vehicular device.

As shown in FIG. 3, in the vehicular device 1, an operating system 20 (hereinafter referred to as "OS 20") is executed on the CPU 10, and multiple application programs 21 (hereinafter referred to as "applications 21") are executed on the OS 20. The applications 21 executed on the OS 20 include a meter application 21a, a navigation application 21b, a safety application 21c, a video application 21d, and a HUD application 21e. HUD is an abbreviation for head up display. Each application 21 is an example, and the applications 21 executed on the OS 20 are not limited to these examples.

Figure 4A:
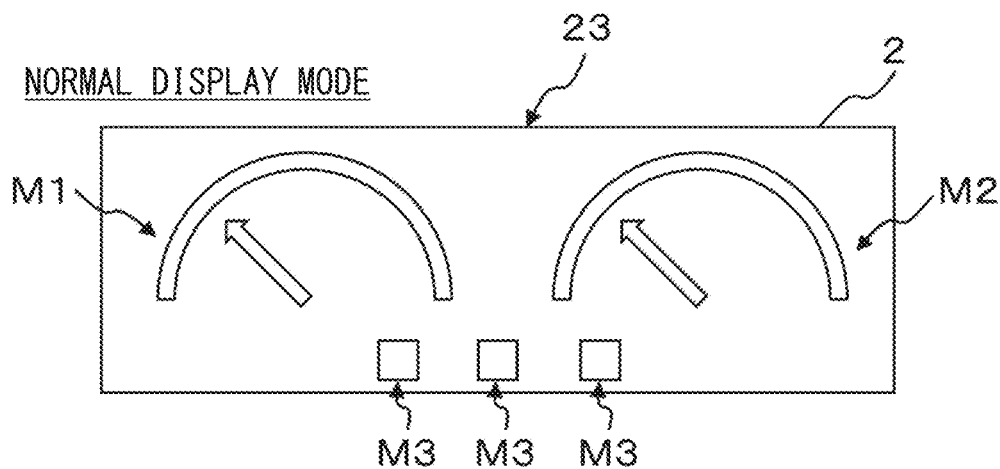
FIG. 4A is a diagram showing an example of a normal display mode of a meter display.

The meter application 21a notifies the user of a speed of the vehicle, a rotation number, or warnings, for example, and also draws surfaces that are mainly displayed on the meter display 2. For example, the meter application 21a draws surfaces for displaying contents such as a speedometer M1, a tachometer M2 or a warning light M3, as shown in a user interface 23 shown in FIG. 4A as a normal display mode.

However, the surfaces drawn by the meter application 21a can also be displayed on the center display 3 or the head-up display 4. The surface drawn by the meter application 21a is relatively required to have the real-time property as compared with the surface drawn by the different exemplified applications 21. Although the meter application 21a instructs the GPU 13 to draw the surface in practice, here, it is expressed that the meter application 21 is to draw the surface for the sake of simplicity. Here, a similar explanation can be applied to the different applications 21.

Figure 4B:
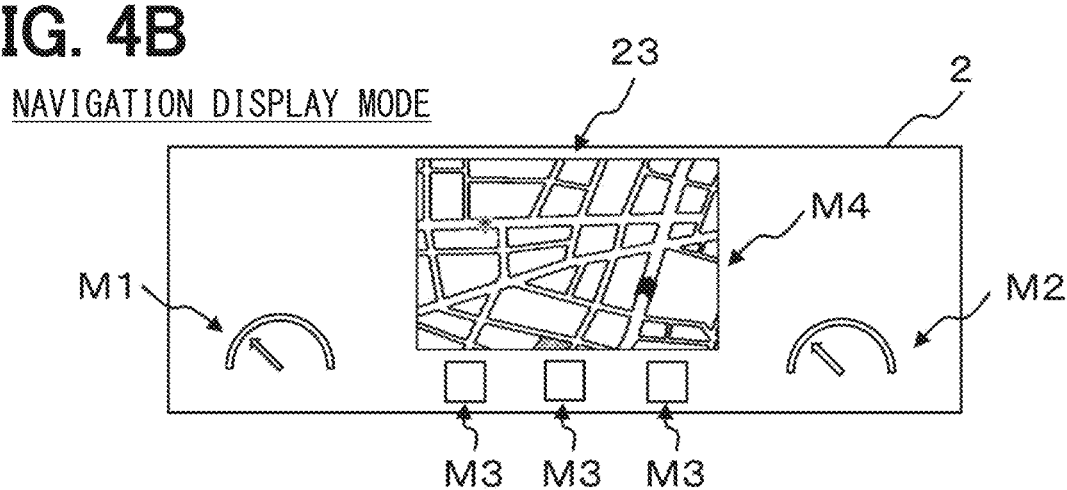
FIG. 4B is a diagram showing an example of a navigation display mode of the meter display.
Figure 5:
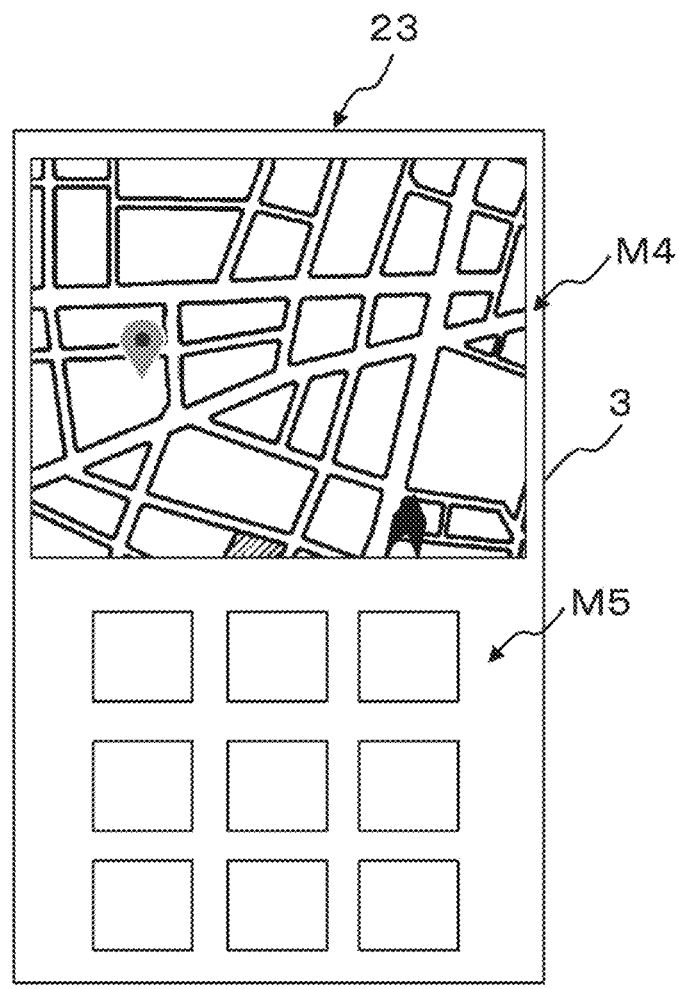
FIG. 5 is a diagram showing an example of a display mode of a center display.

The navigation application 21b implements a navigation function and draws surfaces mainly displayed on the center display 3. For example, as shown in FIG. 5, the navigation application 21b draws a surface for displaying a content such as a navigation screen M4 including a map, a current position of the vehicle, and the like. However, the surfaces drawn by the navigation application 21b can be displayed on the meter display 2 as a navigation display mode shown in FIG. 4B, for example, and can also be displayed on the head-up display 4.

Figure 4C:
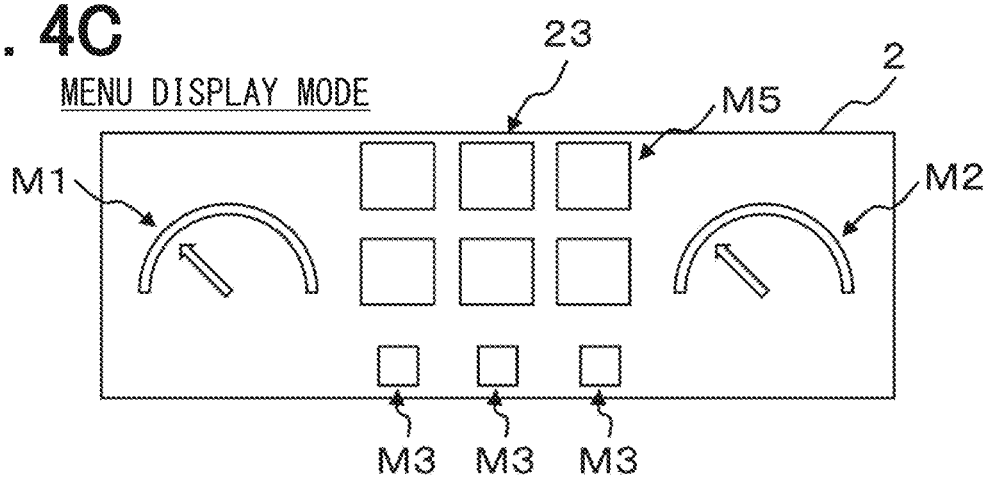
FIG. 4C is a diagram showing an example of a menu display mode of the meter display.

The safety application 21c implements various functions of displaying a menu and driving support, and draws surfaces mainly displayed on the center display 3. For example, as shown in FIG. 5, the safety application 21c draws a surface for displaying a content such as multiple icons M5 for selecting a target function or a content. However, the surface drawn by the safety application 21c can be displayed on the meter display 2 as a menu display mode shown in FIG. 4C, for example, and can also be displayed on the head-up display 4.

Figure 6:
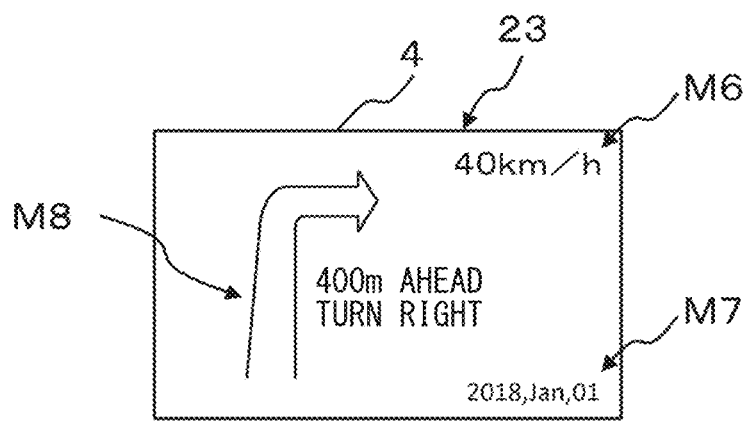
FIG. 6 is a diagram showing an example of a display mode of a head-up display.

The HUD application 21e notifies the user of, for example, a speed, a future course, and the like, and draws surfaces mainly displayed on the head-up display 4. For example, as shown in FIG. 6, the HUD application 21e draws a surface for displaying current speed information M6, time information M7, or course information M8 indicating a distance to a corner, a turning direction, and the like. However, the surfaces drawn by the HUD application 21e can also be displayed on the meter display 2 or the center display 3.

As shown in FIG. 7A to FIG. 7E, a physical surface 30 for drawing the surface is individually allocated to each of the applications 21. That is, each of the applications 21 functions as a drawing unit that draws a surface, which is a content holding unit, on the physical surface 30 allocated to each of the applications 21. Although details will be described later, each if the applications 21 corresponds to a synchronization unit that loads in a surface, which is a content holding unit, into the physical surface 30 allocated to each of the applications 21 and that synchronizes the surface.

The physical surfaces 30 are secured in a size such that necessary surfaces can be drawn, that is, provided on the cache memory 17 or the main memory 12. A size of the physical surface 30 does not need to be equal to the number of pixels of the display device. This is because a necessary surface is selected from the surfaces drawn on the physical surface 30 and displayed on the display device.

In the present embodiment, a physical surface 30A is allocated to the meter application 21a, a physical surface 30B is allocated to the navigation application 21b, a physical surface 30C is allocated to the safety application 21c, a physical surface 30D is allocated to the video application 21d, and a physical surface 30E is allocated to the HUD application 21e. Then, one or more surfaces are drawn on each of the physical surfaces 30 by each of the applications 21.

For example, surfaces SA1 to SA3 are drawn on the physical surface 30A by the meter application 21a. Similarly, a surface SB1 is drawn on the physical surface 30B by the navigation application 21b. Surfaces SC1 and SC2 are drawn on the physical surface 30C by the safety application 21c. In FIG. 7C, for simplification of description, multiple surfaces drawn by the safety application 21c are collectively referred to as the surface SC1. A surface SD1 is drawn on the physical surface 30D by the video application 21. Surfaces SE1 to SE3 are drawn on the physical surface 30E by the HUD application 21e. The above surfaces are examples.

At least one of the contents displayed on the display devices is subjected to an animation operation. Here, the animation operation is a display mode in which a position and a size of an image indicating the content gradually change, the image rotates, the user interface 23 moves as a whole along with a swipe operation, the image gradually fades in or fades out, the color of the image changes, and the like.

For example, as shown in FIG. 4, the speedometer M1, the tachometer M2, a map, a menu, or the like are a content whose size and position change depending on a display mode or the display device at a display destination. However, the animation operation is not limited thereto, and any animation operation in which the display mode changes continuously or intermittently from a certain time point is included.

Next, the effects of the configuration described above will be explained.

As described above, the physical surfaces 30 are individually allocated to the applications 21, and the applications 21 individually draw a surface on the physical surfaces 30. At this time, if display is executed by a method in the related arts in which the IPU 14 combines the surfaces drawn on the physical surfaces 30, a synchronization deviation of the displayed content may occur.

This is because a timing at which the drawing of the surface is completed may be different for each of the applications 21. Here, by using a method in the related arts, in a comparative example shown in FIG. 8A and FIG. 8B, in the navigation display mode of a screen transition, it is assumed that the animation operation of displaying, in an enlarged manner, the speedometer M1 and the tachometer M2 is performed. In FIG. 8B, the reference numerals of the contents are omitted.

Figure 8A:
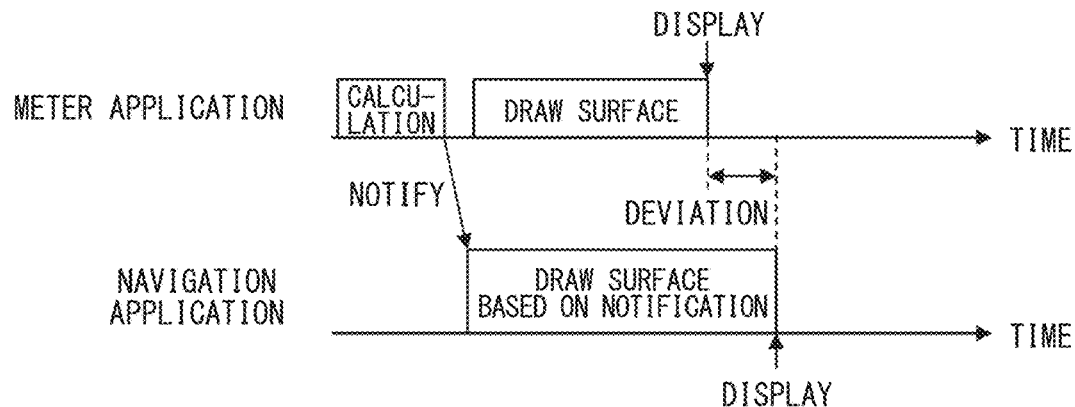
FIG. 8A is a diagram showing an example of a sequence of a display mode by a method as a comparative example.
Figure 8B:
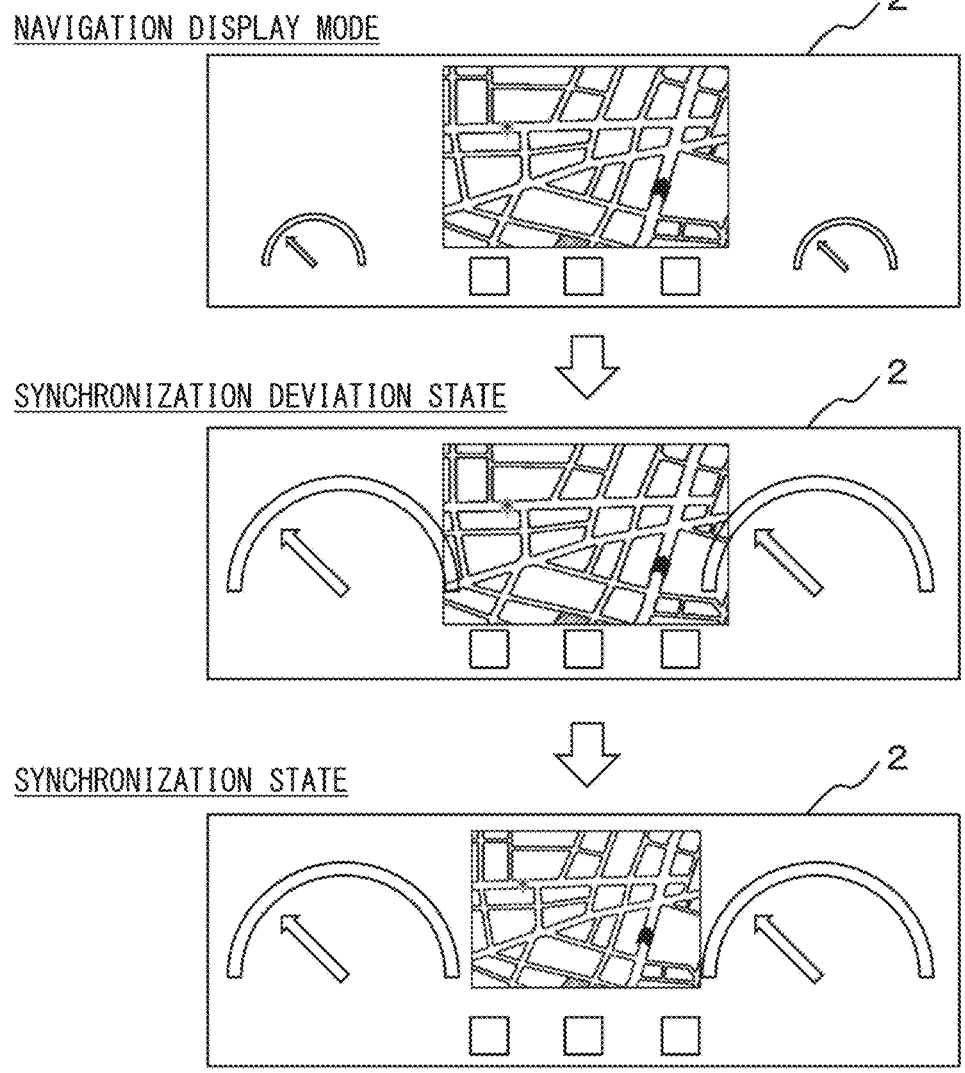
FIG. 8B is a diagram showing an example of a screen transition of the display mode by the method as the comparative example.

In this case, since it is necessary to relatively reduce in size of the map, in the comparative example shown in FIG. 8A and FIG. 8B, as shown in the sequence, the meter application 21a first calculates the size and the position of the surface to be updated, notifies the navigation application 21b of a calculation result, and draws the surface in accordance with the size and the position after the update. On the other hand, when the navigation application 21b receives a notification from the meter application 21a, the navigation application 21b specifies the size and the position of the surface after the update based on the notification, and draws the new surface, that is, executes the update such that the new surface has the specified size and the specified position.

At this time, if the drawing of the surface has been completed first on a meter application 21a side, the IPU 14 combines and displays the surface at that time point. However, since the drawing of the surface is not completed on a navigation application 21b side, an original surface is displayed as it is. As a result, as a synchronization deviation state shown in FIG. 8B, the speedometer M1 and the tachometer M2 may overlap the navigation screen M4.

After that, when the drawing of the surface in the navigation application 21b is completed, each surface is displayed in an intended state as a synchronous state shown in FIG. 8A. The synchronization deviation shown in FIG. 8A and FIG. 8B is an example, and for example, when a menu is displayed in a frame, a synchronization deviation in which the menu does not move even when the frame is moved may occur.

As described above, when the method in the related arts is used, surfaces drawn on different physical surfaces 30 cannot be synchronized, and for example, a display deviation occurs. Since the synchronization at the time of displaying on the display device is deviated, the user may visually recognize the synchronization deviation and may have a feeling of fault.

Therefore, in the vehicular device 1, the surfaces drawn on the different physical surfaces 30 are synchronized in the following manner. Although the following processing can be executed by any application 21, here, a case in which the surface of the speedometer M1 or the like drawn by the meter application 21a and the surface of the navigation screen M4 drawn by the navigation application 21b are synchronized will be described as an example in comparison with the example in FIG. 8A and FIG. 8B described above.

Figure 7A:
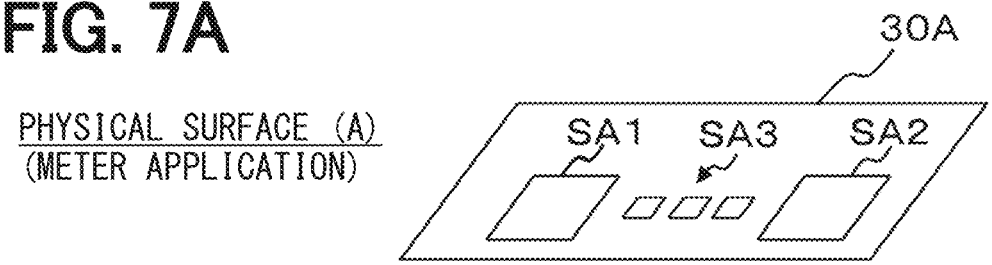
FIG. 7A is a diagram showing an example of a physical surface allocated to a meter application.
Figure 7B:
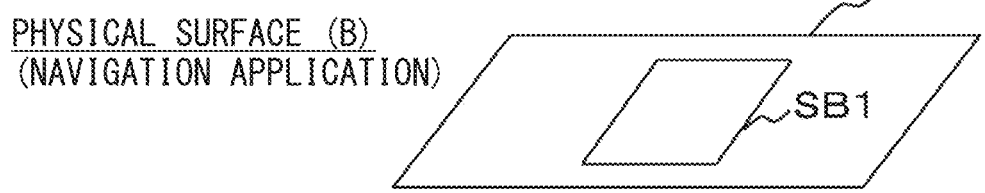
FIG. 7B is a diagram showing an example of a physical surface allocated to a navigation application.
Figure 7C:
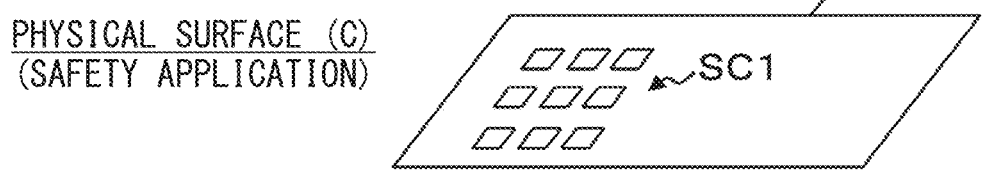
FIG. 7C is a diagram showing an example of a physical surface allocated to a safety application.
Figure 7D:
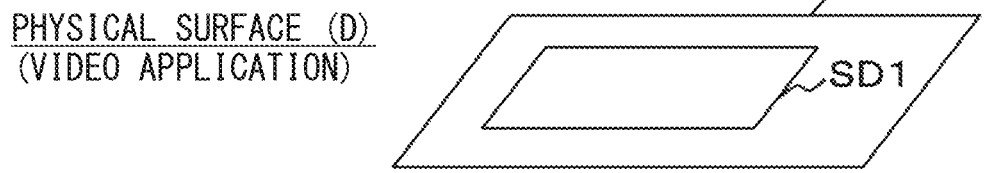
FIG. 7D is a diagram showing an example of a physical surface allocated to a video application.
Figure 7E:
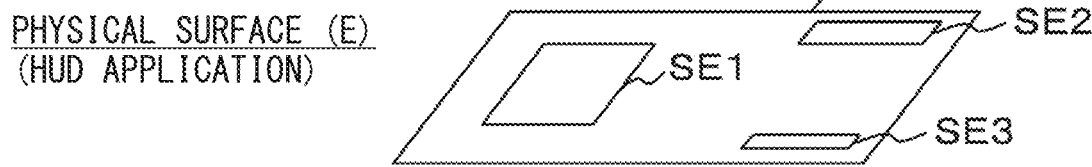
FIG. 7E is a diagram showing an example of a physical surface allocated to a HUD application.
Figure 9:
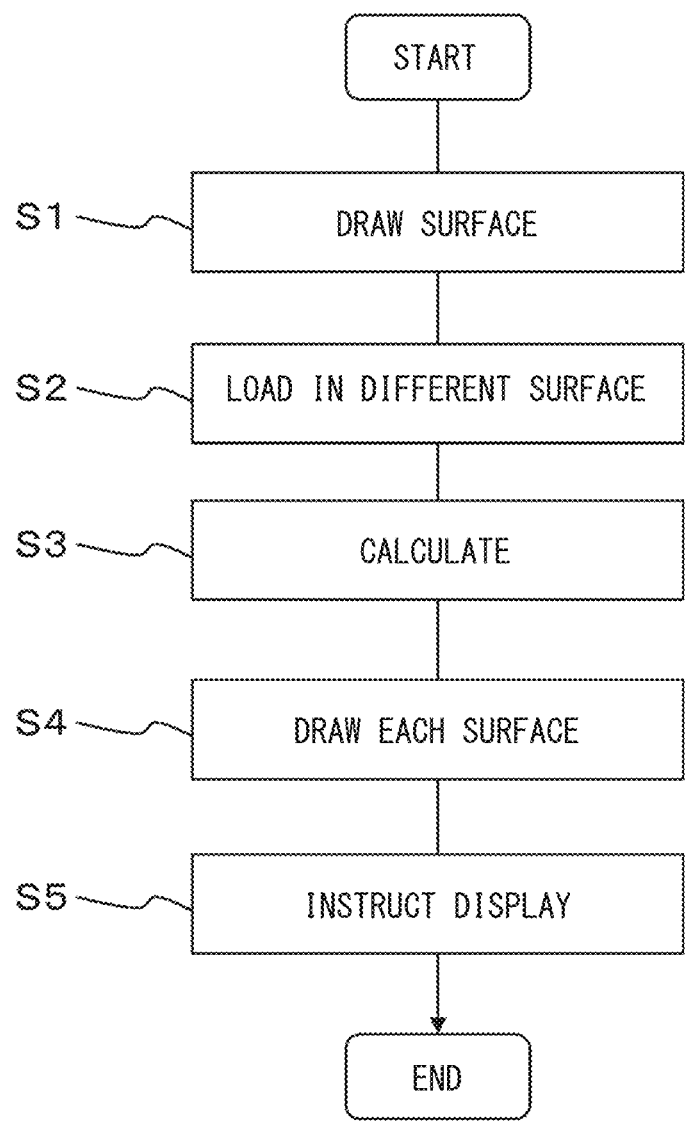
FIG. 9 is diagram showing a flow of a synchronization processing.

The meter application 21a executes the synchronization processing shown in FIG. 9, and draws the surfaces SA1 to SA3 on the physical surface 30A allocated to the meter application 21a in step 51 as shown in FIG. 7A. For example, the meter application 21a draws the surface SA1 for displaying the speedometer M1, the surface SA2 for displaying the tachometer M2, and the surface SA3 for displaying the warning light M3.

Figure 10:
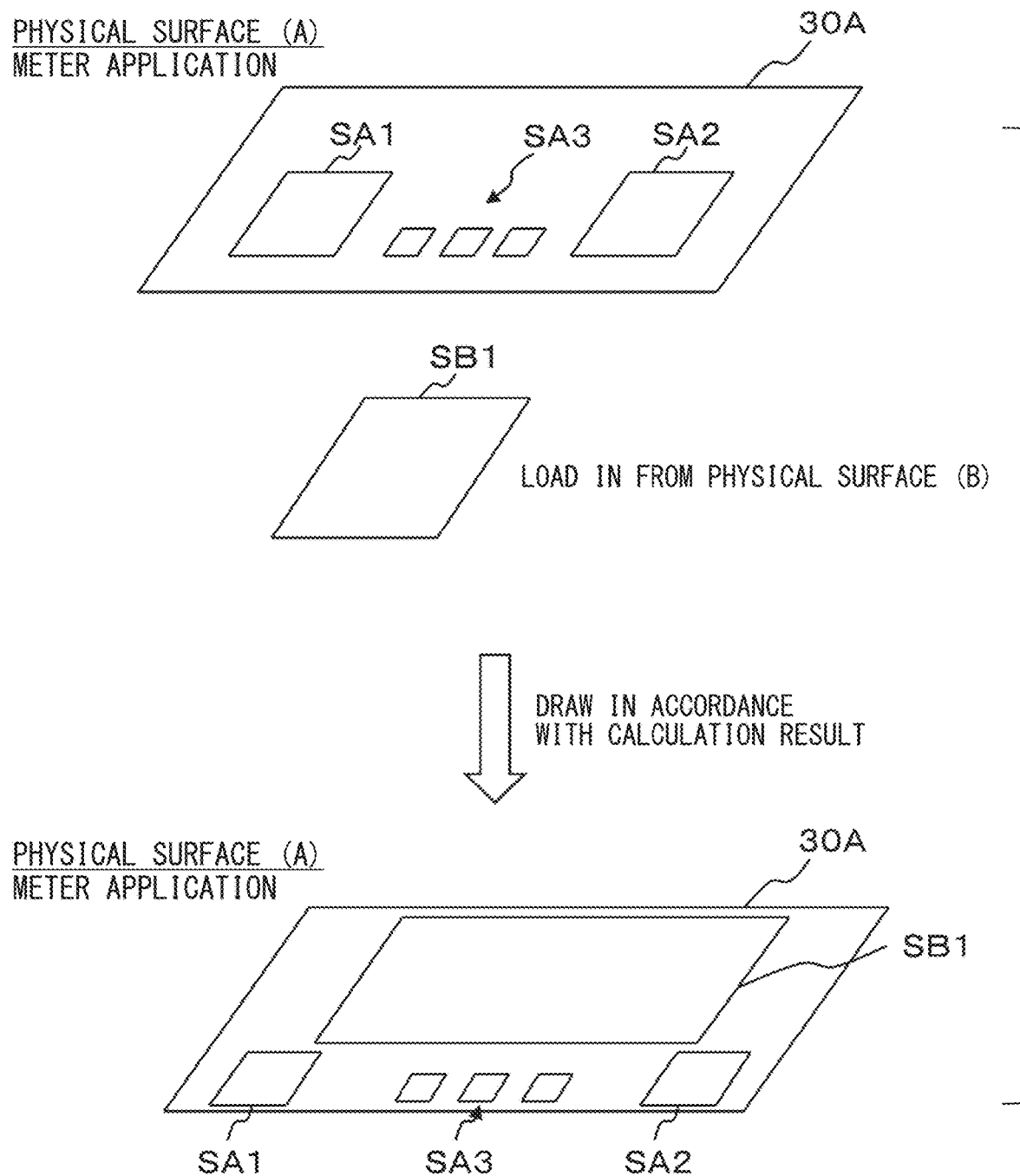
FIG. 10 is a diagram showing an example of a mode of loading in a surface.

Then, in step S2 in the synchronization processing, the meter application 21a loads in the surface drawn on the different physical surface 30. In this case, as shown in FIG. 10, the meter application 21a loads in the surface SB1 drawn on the different physical surface 30B by the navigation application 21b into the physical surface 30A on which the surfaces SA1 to SA3 are drawn. At a time point of loading in, the surface SB1 has a size and a shape when drawn by the navigation application 21b.

Subsequently, in step S3 in the synchronization processing, the meter application 21a calculates a position, a size, a deformation amount, or the like of the surfaces including the surfaces SA1 to SA3 drawn by the meter application 21a and the surface SB1 that is loaded in. That is, the meter application 21a treats the surface SB1 that is loaded in as a texture, and calculates the position, the size, or the deformation amount of the texture, thereby processing the surface SB1 as a surface drawn by the meter application 21a in a pseudo manner.

When the calculation is completed, the meter application 21a draws each surface on the physical surface 30A of the meter application 21a according to a calculation result in step S4 in the synchronization processing. Accordingly, as shown in FIG. 10, the surfaces SA1 to SA3 drawn by the meter application 21a and the surface SB1 drawn by the navigation application 21b are drawn on the physical surface 30A in accordance with the calculated size and position. That is, each surface is redrawn or rearranged according to the calculation result.

At this time, the surface SB1 drawn on the different physical surface 30B is separated from the physical surface 30B at a time point when the surface SB1 is loaded in into the physical surface 30A. Therefore, regardless of a drawing operation of the navigation application 21b, the surface SB1 can be displayed on the meter application 21a with an appropriate size, position, or deformation amount.

Therefore, in step S5 in the synchronization processing, the meter application 21a can display each surface in an appropriate state by instructing display of each surface for which redrawing or rearrangement has been completed. This means that, when an animation operation is executed, the navigation screen M4 is reduced in size as the speedometer M1 and the tachometer M2 are enlarged, and a display can be seamlessly changed without overlapping the speedometer M1, the tachometer M2, and the navigation screen M4.

Figure 11A:
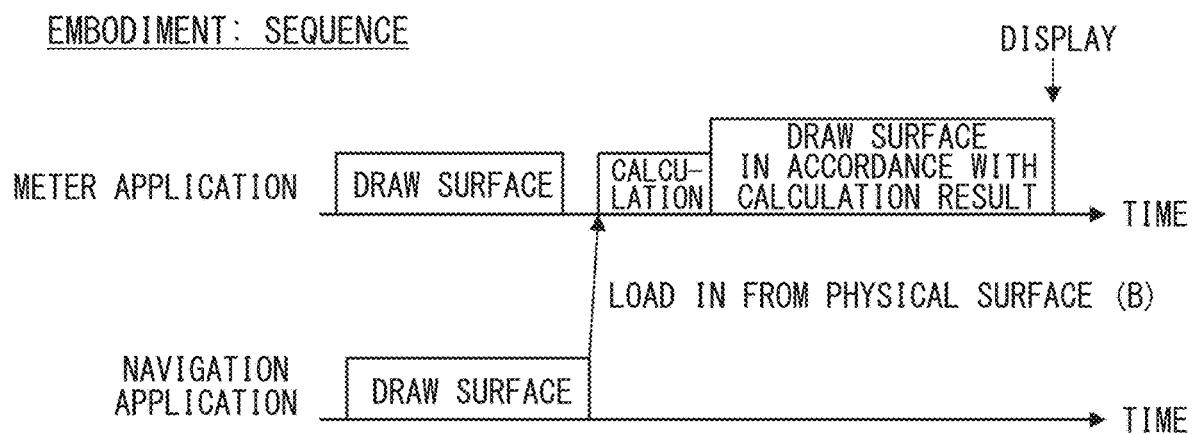
FIG. 11A is a diagram showing an example of a sequence of the display mode of the vehicular device.
Figure 11B:
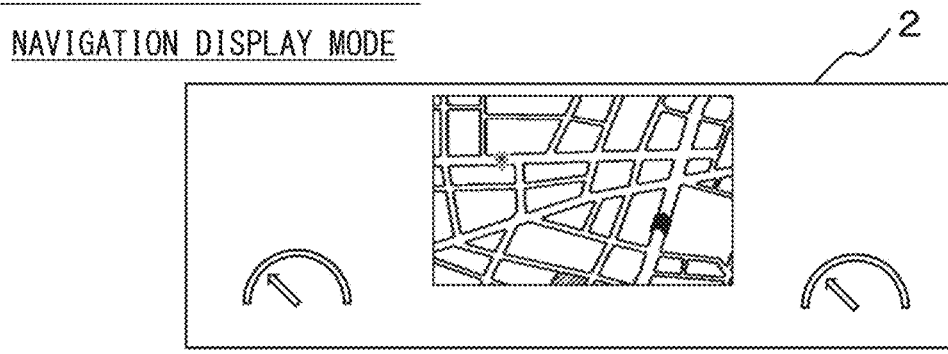
FIG. 11B is a diagram showing an example of a screen transition of the display mode of the vehicular device.
Figure 11B:
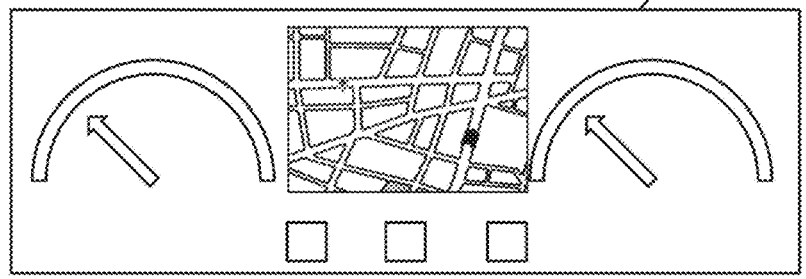

More specifically, in the vehicular device 1, as a sequence according to the embodiment shown in FIG. 11A and FIG. 11B, each application 21 draws a surface. Then, the application 21 requiring the surface drawn on the different physical surface 30, here, the meter application 21a loads in the surface drawn by the navigation application 21b into the physical surface 30 of the meter application 21a, calculates the position, size, and the like of the surface that is loaded in, and redraws the surface.

Accordingly, for example, when the meter application 21a executes an animation operation in which the speedometer M1 or the tachometer M2 is displayed in an enlarged manner, the meter application 21a can control the size, the position, and the like of the surface drawn on the different physical surface 30 so as to correspond to the animation operation. Accordingly, as shown in the embodiment: screen transition, the speedometer M1 and the tachometer M2 are prevented from overlapping the navigation screen M4. That is, it is possible to synchronize the surfaces drawn on the different physical surfaces 30. In FIG. 11B, the reference numerals of the contents are omitted.

According to the embodiment described above, the following effects can be achieved.

The vehicular device 1 can provide multiple contents by one user interface 23, and includes a synchronization unit that synchronizes the surfaces which are content holding units. Then, the synchronization unit loads in a surface drawn on the different physical surface 30 different from the physical surface 30 allocated to the synchronization unit and processes the surface that is loaded in as the surface drawn by the synchronization unit, thereby synchronizing the surface drawn by the synchronization unit with the surface drawn on the different physical surface 30.

Accordingly, even if the surface is drawn on the different physical surface 30, when the surface is displayed on the user interface 23, the synchronization unit can control the timing at which the display is updated. That is, it is possible to share the surface drawn on the different physical surface 30. Accordingly, the surfaces drawn on the different physical surfaces 30 can be synchronized. More specifically, the surface drawn by the synchronization unit and the surface drawn on the different physical surface 30 can be synchronized, and a state in which the user can visually recognize a fault, which is the display deviation or the like, can be avoided.

The control method of the vehicular device 1 includes, when multiple contents are provided by one user interface 23, a step of drawing the surface, which is the content holding unit, on the physical surface 30 allocated to a synchronization unit, a step of loading in a surface drawn on the different physical surface 30 different from the physical surface 30 allocated to the synchronization unit, and a step of synchronizing the surface drawn by the synchronization unit with the surface drawn on the different physical surface 30 by processing the surface that is loaded in as the surface drawn by the synchronization unit.

According to such a control method of the vehicular device 1 as well, the surfaces drawn on different physical surfaces 30 can be synchronized with each other, and the surface drawn by the synchronization unit and the surface drawn on the different physical surface 30 can be synchronized with each other.

In the vehicular device 1, at least one of the contents is subjected to the animation operation. In a case in which the animation operation is executed on the content, if the original surfaces are not synchronized with each other, the display of the content may be deviated, overlapped, or the like, which may cause a fault that the user can visually recognize. Therefore, by synchronizing the original surfaces, even when the position and the size of the content are changed, the above-described fault can be prevented from occurring.

In the vehicular device 1, multiple applications 21 are executed, and the synchronization unit is implemented as the application 21, and synchronizes a surface drawn by the synchronization unit with a surface drawn on the different physical surface 30 by the different application 21. Accordingly, an excessive load can be restricted from being applied to the applications 21.

Therefore, as in the meter application 21a according to the embodiment, the application 21 that draws a surface relatively requiring the real-time property as compared with the surface drawn on the different physical surface 30 can synchronize the surface relatively requiring the real-time property with the surface drawn on the different physical surface 30 without delaying the display of the speedometer M1, the tachometer M2, or the warning light M3 that is required.

The vehicular device 1 includes multiple CPU modules 16, and the synchronization unit synchronizes a surface drawn by the synchronization unit with a surface drawn on the different physical surface 30 provided for a different CPU module 16. In this case, since the physical surface 30 is managed for each CPU module 16, the physical surface 30A on which the meter application 21a draws the surface and the physical surface 30B on which the navigation application 21b draws the surface are shared across the CPU modules 16. With such a configuration, by employing the above-described control method, the surfaces drawn on the different physical surfaces 30 can be synchronized.

(Second Embodiment)

Next, a second embodiment will be described. In the second embodiment, a configuration example of a vehicular device 1 different from that according to the first embodiment will be described. In order to simplify the description, the vehicular device 1, an OS 20, or an application 21 will be described with common reference numerals. A method of a synchronization control and the like are common to those according to the first embodiment.

<First Configuration Example>

Figure 12:
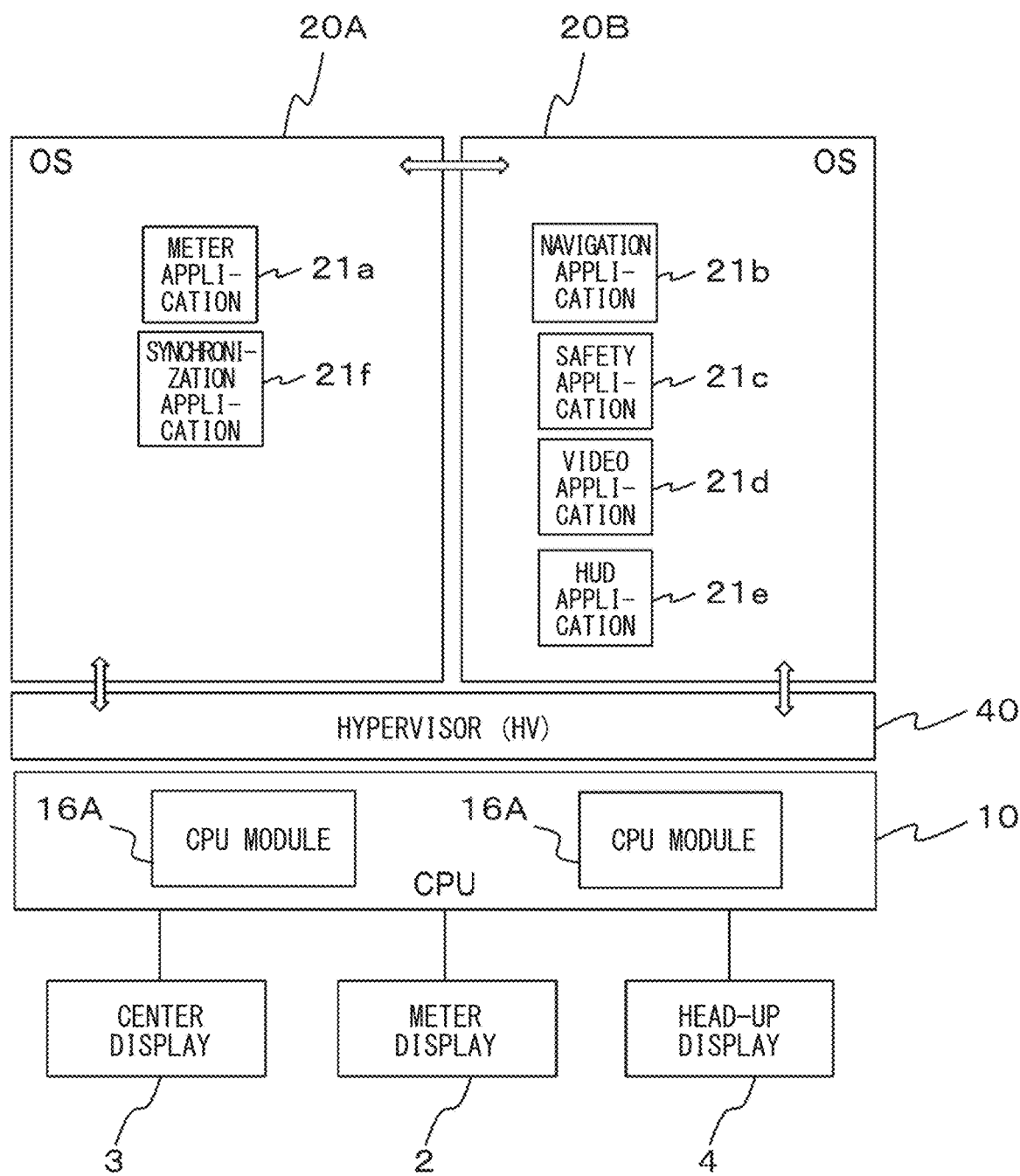
FIG. 12 is a diagram showing a configuration example of a vehicular device according to a second embodiment.

In a first configuration example, as shown in FIG. 12, in the vehicular device 1, a hypervisor 40 is executed on the CPU 10, and multiple, for example, two OSs 20A and 20B are executed on the hypervisor 40. At this time, an OS 20A is allocated to the CPU module 16A, and an OS 20B is allocated to a CPU module 16B. In the present embodiment, it is assumed that the OS 20A is in charge of processing having a relatively high real-time property, and the OS 20B is in charge of processing having a relatively low real-time property.

Therefore, in the OS 20A, for example, a meter application 21a that requires the real-time property is executed, and in the OS 20B, a navigation application 21b, a safety application 21c, a video application 21d, an HUD application 21e, and the like that do not require the real-time property as much as the OS 20A are executed. The type of the OS 20 and the arrangement of the applications 21 are merely examples, and the present invention is not limited thereto.

In this case, since a physical surface 30 is managed for each OS 20, a physical surface 30A on which the meter application 21a draws a surface and a physical surface 30B on which the navigation application 21b draws a surface are across CPU modules 16 and the OS 20. In other words, a synchronization unit needs to share the surfaces across the CPU modules 16 and the OS 20. Even in such a case, by adopting the control method described in the first embodiment, the surfaces drawn on the different physical surfaces 30, here, the physical surfaces 30 of the different OSs 20 of the different CPU modules 16 can be shared and synchronized.

Although in the first embodiment, the configuration in which each surface is used as the synchronization unit by the application 21 that draws the surface by the synchronization unit, that is, the application 21 has been exemplified, a configuration can be adopted in which a synchronization application 21f dedicated to synchronization is implemented and the drawing of the surface and the sharing of the surface are separately processed. In other words, the synchronization unit that draws the surface, which is a content holding unit, on the physical surface 30 allocated to the synchronization unit, and an application 21f serving as a synchronization unit that loads in, into the physical surface 30 allocated to the application 21f, a surface drawn on the different physical surface 30 and calculates a position, a size, or a deformation amount of the surface loaded in can be provided. Even with such a configuration, the surfaces drawn on the different physical surfaces 30 can be synchronized by loading in by the synchronization unit the surfaces drawn by the synchronization unit. The synchronization application 21f can be applied to all of the display devices, and can be individually provided in each of the display devices.

The hypervisor 40 may be configured to be executed as a function of the OS 20A. That is, the OS 20A can be executed on the CPU 10, the hypervisor 40 can be operated as a function of the OS 20, and the OS 20B can be executed on the hypervisor 40.

<Second Configuration Example>

Figure 13:
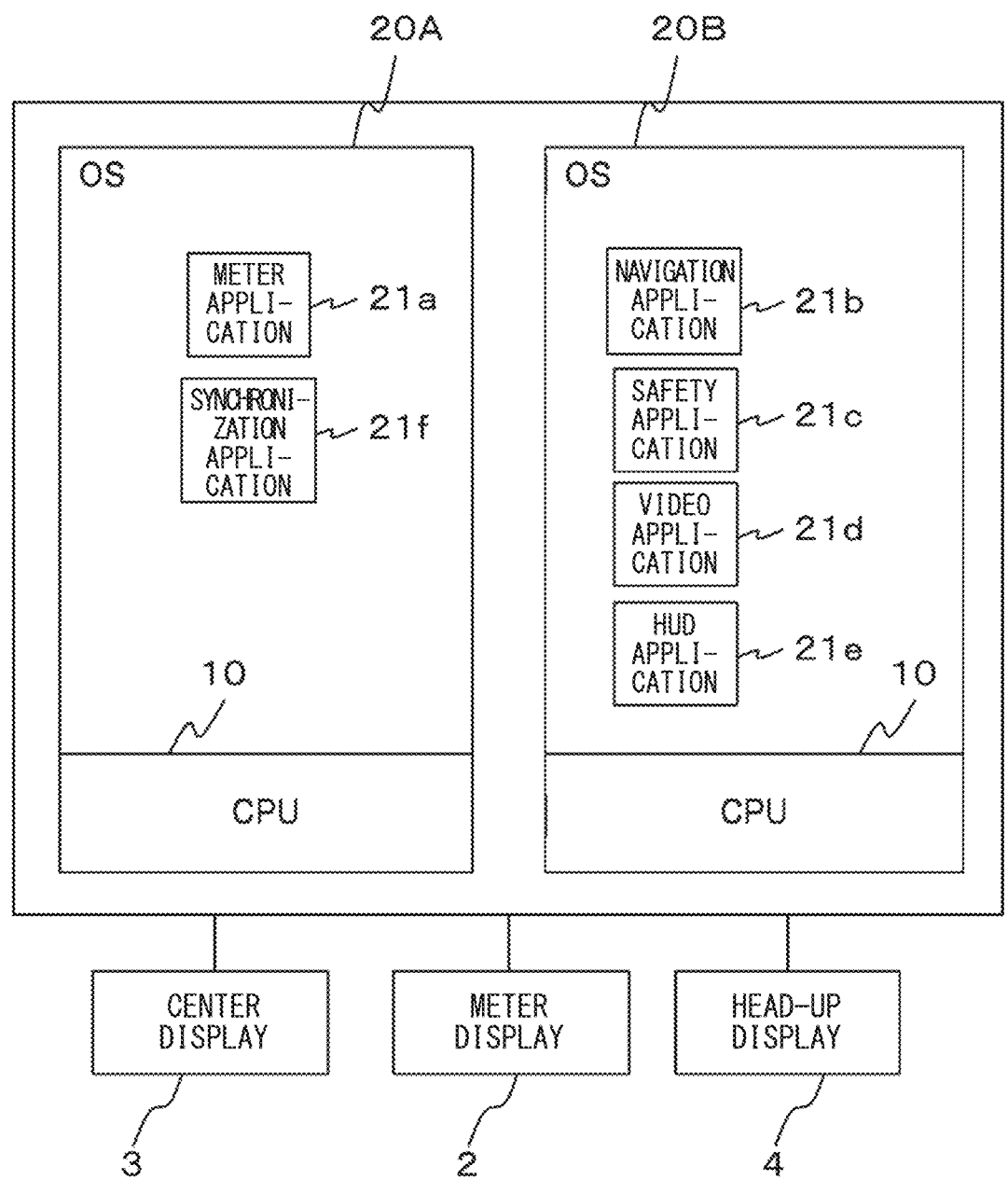
FIG. 13 is a diagram showing another configuration example of a vehicular device.

In a second configuration example, as shown in FIG. 13, the vehicular device 1 includes multiple CPUs 10, and each of the OS 20A and the OS 20B is executed on a respective one of the CPUs 10. In this case, since the physical surface 30 is managed for each CPU 10, the physical surface 30A on which the meter application 21a draws the surface and the physical surface 30B on which the navigation application 21b draws the surface are across the CPU 10.

In other words, the synchronization unit needs to share the surface across the CPU 10. Even in such a case, by adopting the control method described in the first embodiment, the surfaces drawn on the different physical surfaces 30, here, the physical surfaces 30 on different CPU module 16 sides can be shared and synchronized.

(Third Embodiment)

Next, a third embodiment will be described. In the third embodiment, an example in which surfaces are synchronized between a vehicular device 1 and an ECU 6 will be described. In order to simplify the description, the vehicular device 1, an OS 20, or an application 21 will be described with common reference numerals. The configuration of the vehicular device 1 is similar to the configuration of the vehicular device 1 according to the first embodiment or the second embodiment, and a synchronization control method similar to the synchronization control method according to the first embodiment can be adopted.

Figure 14:
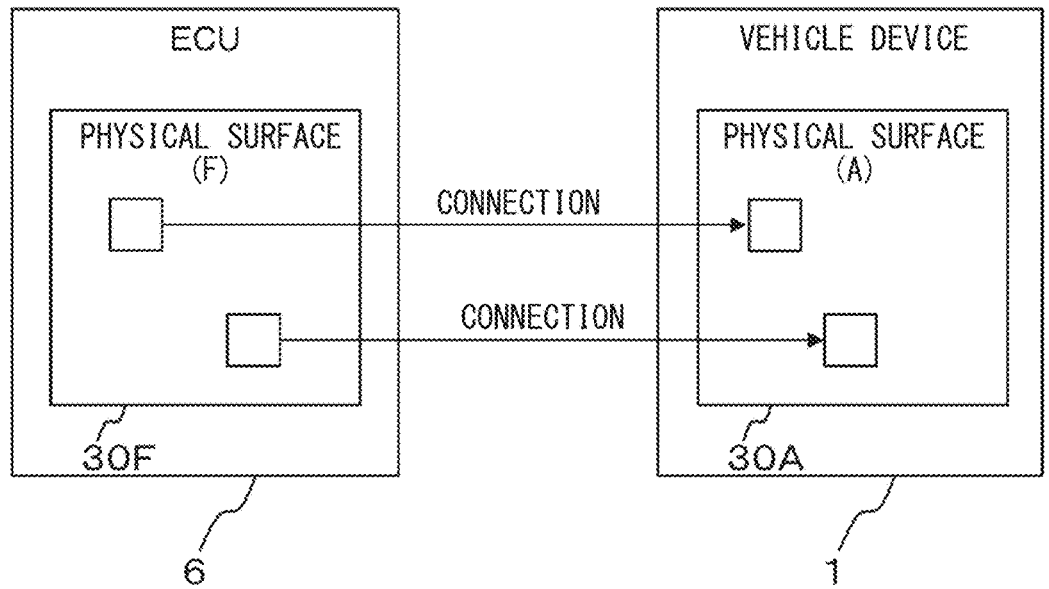
FIG. 14 is a first diagram showing an example of how to load in surfaces in a third embodiment.
Figure 15:
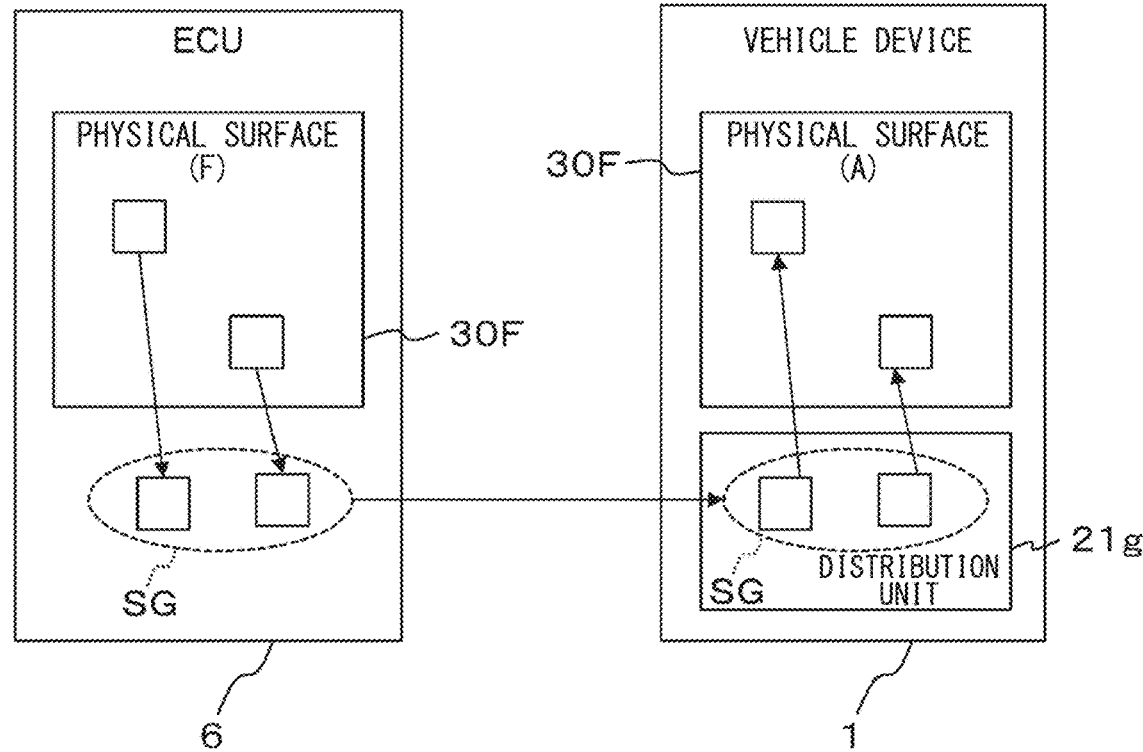
FIG. 15 is a second diagram showing an example of how to load in surfaces.

In the third embodiment, as shown in FIG. 14, the vehicular device 1 is communicably connected to another ECU 6, and synchronizes, using a control method similar to the control method according to the first embodiment, a surface drawn on a physical surface 30 by the synchronization unit of the vehicular device 1 and the surface drawn on a different physical surface 30 of the ECU 6.

Specifically, in the case of the meter application 21a, for example, the vehicular device 1 loads in the surface drawn on the physical surface 30F into the physical surface 30A of the vehicular device 1, calculates a position, a size, or a deformation amount, draws each surface based on a calculation result, and then displays the surface, thereby synchronizing the surface drawn on the physical surface 30A by the vehicular device 1 with the surface drawn on the different physical surface 30F.

At this time, the vehicular device 1 can individually attach a connection to load in the surface drawn on the physical surface 30F of the ECU 6. Accordingly, the necessary surfaces can be individually loaded in, and the surfaces drawn on the different physical surfaces 30 can be synchronized.

Alternatively, the vehicle device 1 can collectively load in a surface group SG in which multiple surfaces drawn on the physical surface 30F on the ECU 6 side are collected on the ECU 6 side, and providing a distribution unit 21g as the application 21 that individually distributes the loaded in surface group SG to, for example, the physical surface 30A allocated to the meter application 21a.

Accordingly, the surfaces drawn on the different physical surfaces 30 can be synchronized while simplifying the processing of loading in the surface and reducing a communication amount between the vehicular device 1 and the ECU 6. The distribution unit 21g may be implemented by hardware.

(Fourth Embodiment)

Next, a fourth embodiment will be described. In the fourth embodiment and the fifth embodiment to be described later, methods of reducing a load on a cache memory or a bus will be described. Since a configuration of a vehicular device 1 is similar to the configurations of the vehicular devices 1 according to the first to third embodiments, the description will be made with reference to FIGS. 1 to 15 as necessary.

As shown in FIG. 1, FIG. 12, or FIG. 13, the vehicular device 1 includes multiple CPU modules 16. Each CPU module 16 is individually provided with a cache 17. The vehicular device 1 has an electrical configuration shown in FIG. 2, and each application 21 draws a surface on an individual physical surface 30 as shown in FIG. 7A to FIG. 7E. The physical surface 30 is provided in the cache 17 or a main memory 12.

Figure 16:
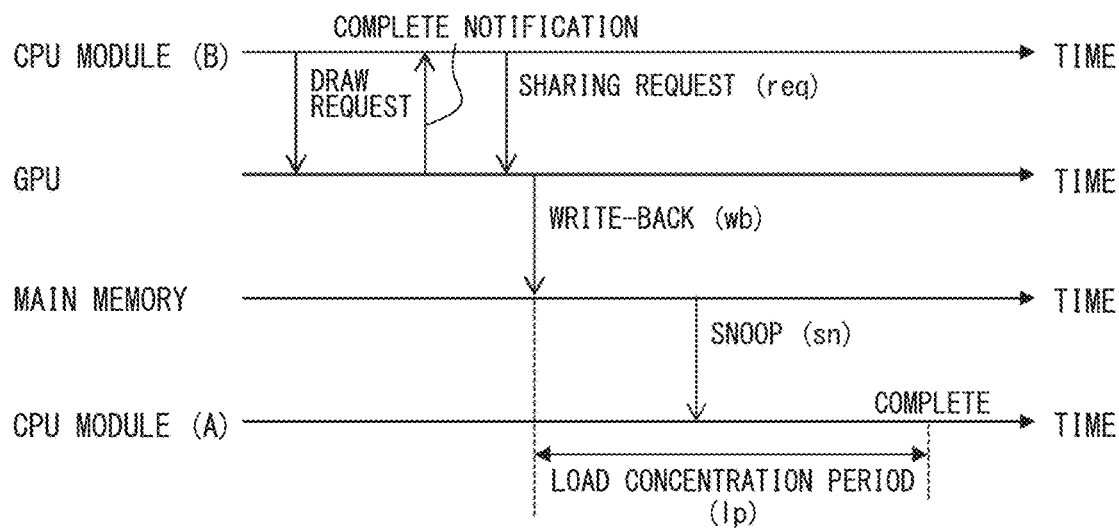
FIG. 16 is a diagram showing a sequence of sharing a surface as a comparative example according to a fourth embodiment.

First, a case in which a surface drawn by a CPU module 16B side is shared with a CPU module 16A side is assumed, and a basic flow when the surface is shared will be described. As shown in FIG. 16, the CPU module 16B outputs a drawing request for actually drawing the surface to be shared to a GPU 13. The drawing request is output from the CPU module B to the GPU 13 as indicated by an arrow F1 shown in FIG. 17. Prior to the operations, the CPU module 16A notifies the CPU module 16B of sharing the surface.

Figure 17:
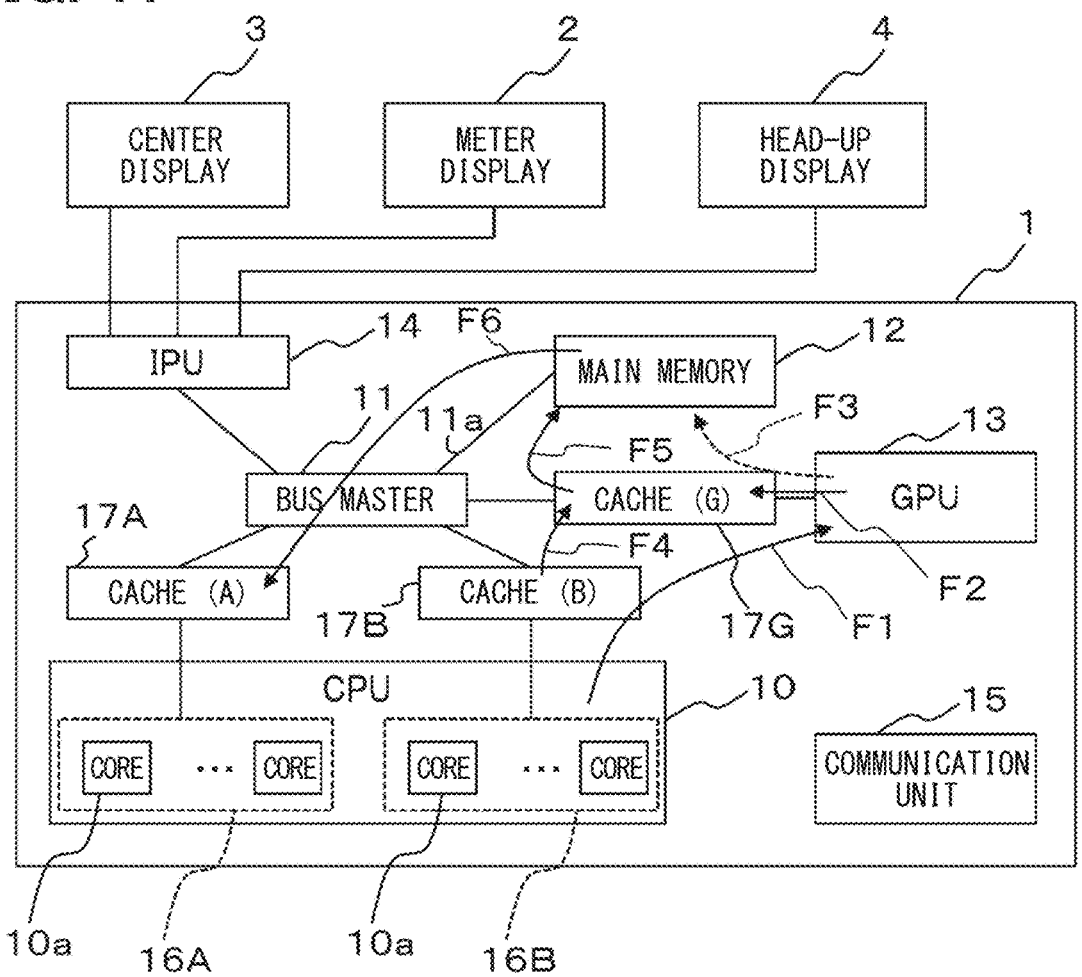
FIG. 17 is a diagram showing an example of order in which the surface is shared.

Upon receiving the drawing request, the GPU 13 draws a surface in a cache 17G of the GPU 13 as indicated by an arrow F2 in FIG. 17. At this time, the GPU 13 writes back an amount that is not stored in the cache 17G to the main memory 12 at any time as indicated by an arrow F3 shown in FIG. 17.

When the drawing is completed, as shown in FIG. 16, the GPU 13 notifies the CPU module B of a completion of the drawing. However, in a drawing method in the related arts, the completion of the drawing is notified when the drawing of an entire surface is completed.

The CPU module B that has received the notification of the completion of the drawing outputs a sharing request for sharing the surface to the GPU 13. Hereinafter, the sharing request is also referred to as req. The sharing request is output from the CPU module B side to the GPU 13 as indicated by an arrow F4 shown in FIG. 17.

Upon receiving the sharing request, the GPU 13 writes back a target surface to the main memory 12. Hereinafter, the write-back is also referred to as wb. At this time, if the surface is provided on the cache 17G, a write back from the cache 17G to the main memory 12 is executed as indicated by an arrow F5 shown in FIG. 17.

Thereafter, as shown in FIG. 16, snoop from the main memory to the CPU module A side is executed. Hereinafter, snoop is also referred to as sn. The snoop is executed from the main memory 12 to the cache 17A of the CPU module A as indicated by an arrow F6 shown in FIG. 17. Accordingly, the surfaces to be shared among the caches provided in the CPU modules 16 are synchronized.

The sharing request indicated by the arrow F4, the write-back indicated by the arrow F5, and the snoop indicated by the arrow F6 in FIG. 17 occur each time the surface is shared. Therefore, each time a surface is shared, a load is applied to the bus 11a, and a latency increases.

In the case of the drawing method in the related arts described above, the sharing request is output at the timing when the entire surface is drawn. Therefore, as a load concentration period shown in FIG. 16, the load is concentrated at the timing, and the snoop is required for the entire surface. Therefore, a period required until one snoop is completed is long. As a result, display or the like on the meter display requiring the real-time property may not be executed smoothly. Hereinafter, the load concentration period is also referred to as Ip for convenience.

Therefore, in the vehicular device 1, a bus load is reduced in the following manner. Although in the following description, the vehicular device 1 will be mainly described for simplification of description, the processing is performed by the CPU module 16 and the GPU 13 in cooperation with each other. That is, in the present embodiment, the CPU module 16 and the GPU 13 function as a memory synchronization unit that synchronizes multiple caches 17. More specifically, the CPU module 16, the OS 20, the application 21, the GPU 13 that receives an instruction from the CPU module 16 side, or the like can constitute a memory synchronization unit.

Figure 18:
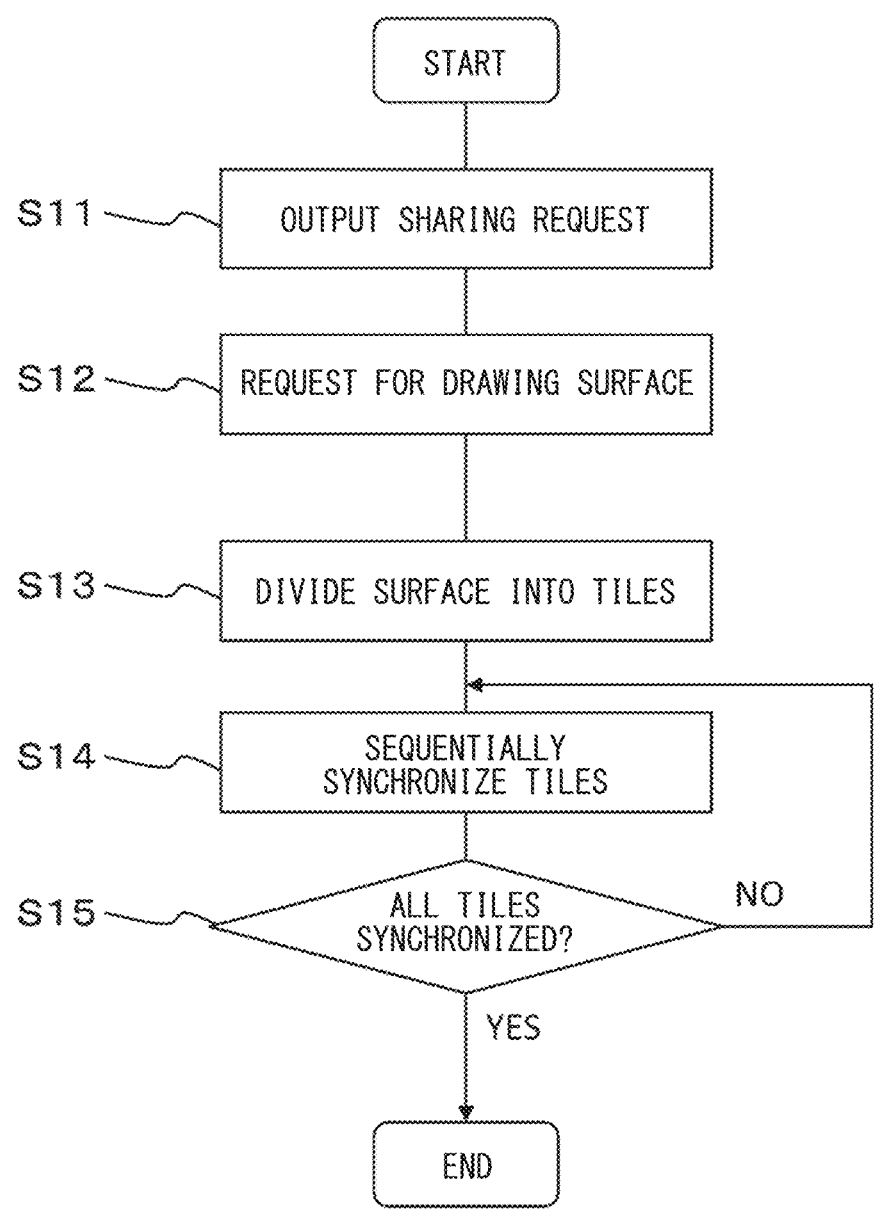
FIG. 18 is a diagram showing a flow of memory synchronization processing.
Figure 19:
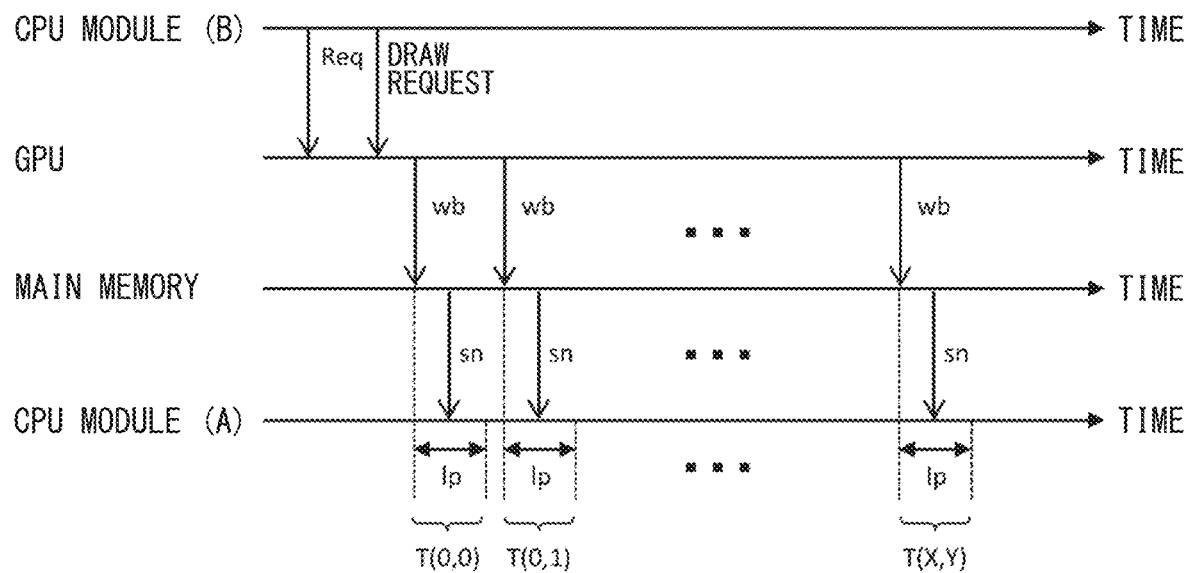
FIG. 19 is a diagram showing a sequence of sharing a surface.

The vehicular device 1 executes the processing shown in FIG. 18, and first outputs the sharing request. Specifically, as shown in FIG. 19 as an embodiment, the sharing request is output from the CPU module 16B to the GPU 13. The sharing request is to notify the GPU 13 that the surface under a next drawing request is to be shared.

Subsequently, in step S12 in FIG. 18, the vehicular device 1 outputs a drawing request for actually drawing the surface. In this case, as shown in FIG. 19, the CPU module 16B outputs the drawing request to the GPU 13.

Figure 20:
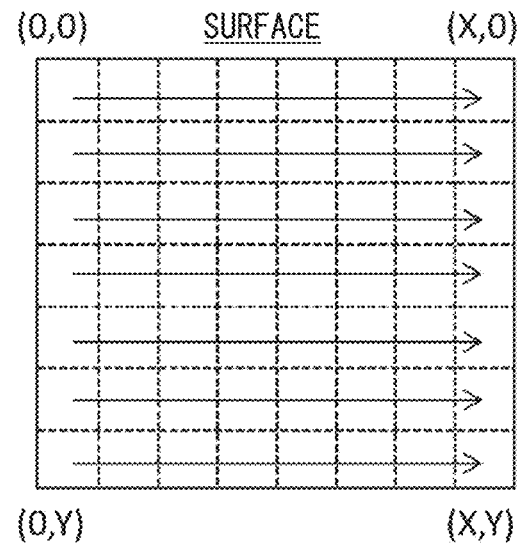
FIG. 20 is a diagram showing a route for synchronizing tiles.

Subsequently, in step S13 in FIG. 18, the vehicular device 1 divides the surface into multiple tiles. In this case, as shown in FIG. 20, the vehicular device 1 divides one surface into multiple tiles in a two-dimensional array from T (0, 0) to T (X, Y), for example. Then, in step S14 in FIG. 18, the vehicular device 1 sequentially executes synchronization from the tiles for which the drawing has been completed.

That is, the vehicular device 1 sequentially writes back the tiles to the main memory 12, thereby providing the shared surfaces in the main memory 12 and enabling synchronization. In other words, the shared surfaces are not cached. The surfaces that are not shared are provided in the cache 17.

At this time, for example, as a route indicated by arrows in FIG. 20, the vehicular device 1 synchronizes the tiles in a route from T (0, 0) toward T (X, 0) such as T (1, 0), then synchronizes the tiles in a route from T (1, 0) toward T (1, Y), and finally sequentially synchronizes the tiles in the surface in a lateral direction in a route from T (0, Y) toward T (X, Y). That is, the vehicular device 1 sequentially synchronizes the tiles along a route in which each of the tiles is not repeated. Tiles for which drawing has not been completed are skipped.

Then, in step S15 in FIG. 18, the vehicular device 1 determines whether all tiles have been synchronized. When not all tiles have been synchronized, the vehicular device 1 determines NO in step S15, and synchronizes the tiles that have not yet been synchronized. In this case, the tiles that have already been synchronized are skipped.

In this case, as shown in FIG. 19, the tiles are sequentially written back to the main memory 12 from the tile in which the drawing has been completed, and are snooped to the CPU module 16A side. In other words, unlike the drawing method in the related arts in FIG. 16 described above, the write-back and the snoop for one surface are executed in a distributed manner multiple times. Since the writing back is executed for each tile, a period until one snoop is completed is shorter than that of the drawing method in the related arts.

Accordingly, the bus load when the caches 17 is synchronized can be reduced. That is, according to the vehicular device 1 and the control method, the bus load can be distributed, and a period required until one snoop is completed can be shortened. Therefore, the display or the like on the meter display that requires the real-time property can be smoothly executed.

According to the vehicular device 1 described above, the following effects can be achieved.

The vehicular device 1 includes multiple CPU modules 16, multiple caches 17 respectively allocated to the multiple CPU modules 16, and a memory synchronization unit that includes the CPU modules 16 and the GPU 13 according to the present embodiment and that synchronizes the multiple caches 17. The memory synchronization unit synchronizes the surfaces drawn in the caches 17, divides the surfaces to be synchronized into multiple tiles, and sequentially synchronizes the surfaces from the tiles for which the drawing has been completed among the divided tiles.

Accordingly, the bus load when the caches 17 are synchronized can be reduced. The bus load can be distributed, and the period required until one snoop is completed can be shortened. Therefore, the load on the caches 17 and the bus 11a can be reduced. The display or the like on the meter display that requires the real-time property can be smoothly executed.

Similarly, the loads on the cache 17 and the bus 11a can be reduced according to the control method of the vehicular device 1 including the processing of dividing the surfaces drawn in the multiple caches 17 respectively allocated to the CPU modules 16 into multiple tiles, and the processing of sequentially synchronizing the surfaces from the tiles for which the drawing has been completed among the divided tiles.

The vehicular device 1 provides a surface used by the single CPU module 16 in the cache 17, and provides a surface shared with another CPU module 16 in the main memory 12. Accordingly, a surface used alone can be drawn at high speed, and the shared surface can be used from another CPU module. Therefore, it is significant when multiple contents are provided using one user interface.

The vehicular device 1 divides the surface into rectangular tiles, and sequentially synchronizes the tiles along a route in which each of the tiles is not repeated. More specifically, the vehicular device 1 synchronizes all tiles in the surface without overlapping tiles for which the synchronization has been completed. Accordingly, unnecessary synchronization processing, that is, the occurrence of a bus load can be prevented.

In the vehicular device 1, the OS 20 is executed on each of the multiple CPU modules 16. That is, in the case of the vehicular device 1, the surface is shared across the OSs 20. Accordingly, even when the OS 20 is separately implemented according to the real-time property or a multimedia performance, the surface can be suitably shared.

The vehicular device 1 controls display on multiple display devices. In this case, it is assumed that surfaces drawn on the different applications 21, the different OSs 20, or the different CPU modules 16 side are required in each display device. Even in such a case, the load on the cache 17 and the bus 11a can be reduced by adopting the vehicular device 1 or the above-described control method, and thus the surface can be seamlessly and smoothly shared.

The configuration and the method according to the fourth embodiment and the fifth embodiment described below can be adopted in combination with a configuration and a method according to the sixth embodiment described later. That is, the configuration in which the bus load according to the present embodiment is distributed and the configuration in which the bus load itself is reduced, which will be described later, can be combined with each other.

(Fifth Embodiment)

Next, the fifth embodiment will be described. In the fifth embodiment, other routes when tiles are synchronized will be described.

Figure 21:
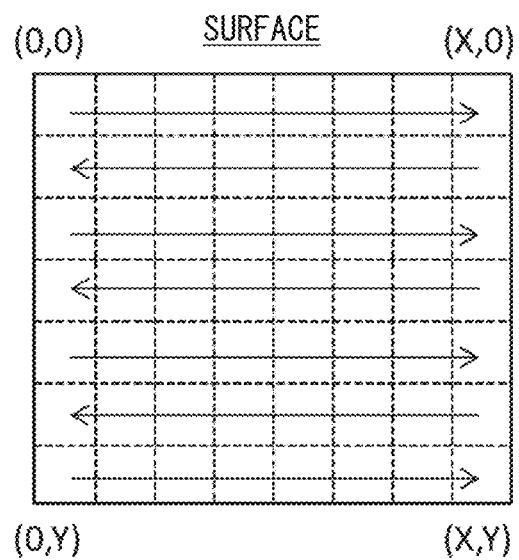
FIG. 21 is a first diagram showing a route for synchronizing tiles according to a fifth embodiment.

When the vehicular device 1 is divided into multiple tiles in a two-dimensional array from T (0, 0) to T (X, Y), for example, as in a route indicated by an arrow in FIG. 21, after the tiles have been synchronized in a route from T (0, 0) toward T (X, 0), the tiles are synchronized in a route from T (X, 1) toward T (0, 1), and then the tiles are synchronized in a route from T (0, 2) toward T (X, 2). Accordingly, the tiles can be synchronized in a route that reciprocates in a horizontal direction in the surface. Even in such a route, the tiles can be sequentially synchronized along the route in which each of the tiles is not repeated.

Figure 22:
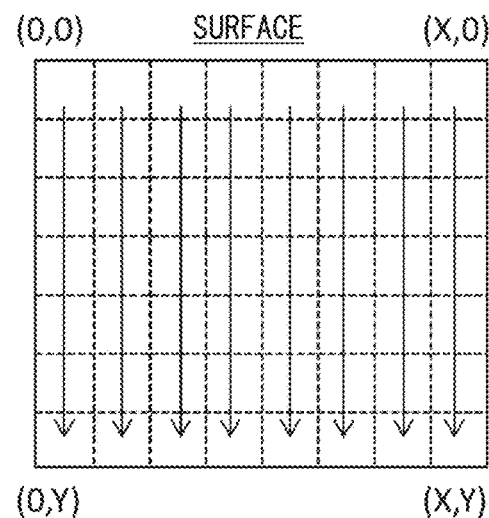
FIG. 22 is a second diagram showing the route for synchronizing tiles.

When the vehicular device 1 is divided into multiple tiles in a two-dimensional array from T (0, 0) to T (X, Y), for example, as in a route indicated by an arrow in FIG. 22, after the tiles have been synchronized in a route from T (0, 0) toward T (0, Y), the tiles are synchronized in a route from T (1, 0) toward T (1, Y), and then the tiles are synchronized in a route from T (0, 2) toward T (X, 2). Accordingly, the tiles can be synchronized in a route that is toward a vertical direction in the surface. Even in such a route, the tiles can be sequentially synchronized along the route in which each of the tiles is not repeated.

Figure 23:
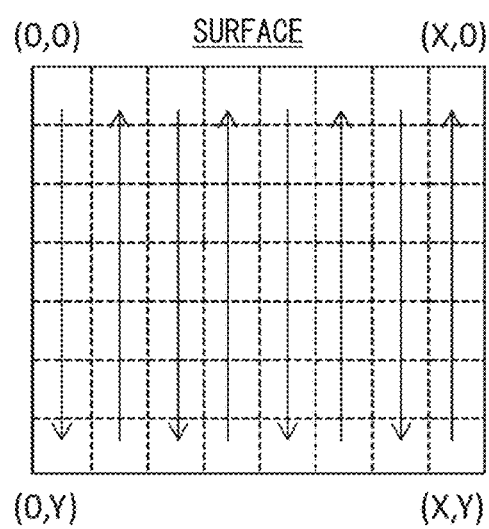
FIG. 23 is a third diagram showing the route for synchronizing tiles.

When the vehicular device 1 is divided into multiple tiles in a two-dimensional array from T (0, 0) to T (X, Y), for example, as in a route indicated by an arrow in FIG. 23, after the tiles have been synchronized in a route from T (0, 0) toward T (0, Y), the tiles are synchronized in a route from T (1, Y) toward T (1, 0), and then the tiles are synchronized in a route from T (2, 0) toward T (2, Y). Accordingly, the tiles can be synchronized in a route that reciprocates in the vertical direction in the surface. Even in such a route, the tiles can be sequentially synchronized along the route in which each of the tiles is not repeated.

Figure 24:
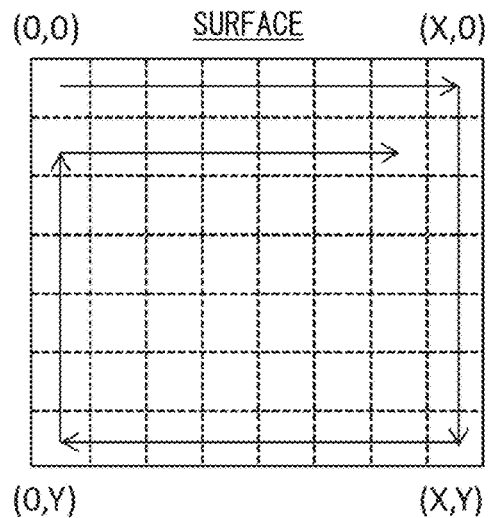
FIG. 24 is a fourth diagram showing the route for synchronizing tiles.

When the vehicular device 1 is divided into multiple tiles in a two-dimensional array from T (0, 0) to T (X, Y), for example, as in a route indicated by an arrow in FIG. 24, after the tiles have been synchronized in a route from T (0, 0)

toward T (X, 0), the tiles are synchronized in a route toward T (X, Y), and then the tiles are synchronized in a route toward T (0, Y). Accordingly, the tiles can be synchronized with each other in a route that goes around in the surface from an outer edge toward a center. Even in such a route, the tiles can be sequentially synchronized along the route in which each of the tiles is not repeated. On the contrary, the tiles can be synchronized in a route that goes around from the center of the surface toward the outer edge of the surface.

(Sixth Embodiment)

Next, the sixth embodiment will be described. In the sixth embodiment, a method for reducing a load on a cache memory or a bus, which is different from those according to the fourth embodiment and the fifth embodiment, will be described. Since a configuration of a vehicular device 1 is similar as that according to the first to third embodiments, the description will be made with reference to FIGS. 1 to 15 as necessary. Since the bus load is similar as that according to the fourth embodiment, the bus load will be described with reference to FIG. 17 and the like.

As shown in FIG. 2, FIG. 12, or FIG. 13, the vehicular device 1 includes multiple CPU modules 16. In the vehicular device 1, multiple OSs 20 are executed as shown in FIG. 12 or 13. Each CPU module 16 is individually provided with a cache 17. The vehicular device 1 has an electrical configuration shown in FIG. 2, and each application 21 draws a surface on an individual physical surface 30 as shown in FIG. 7A to FIG. 7E. The physical surface 30 is provided in the cache 17 or a main memory 12.

Figure 25:
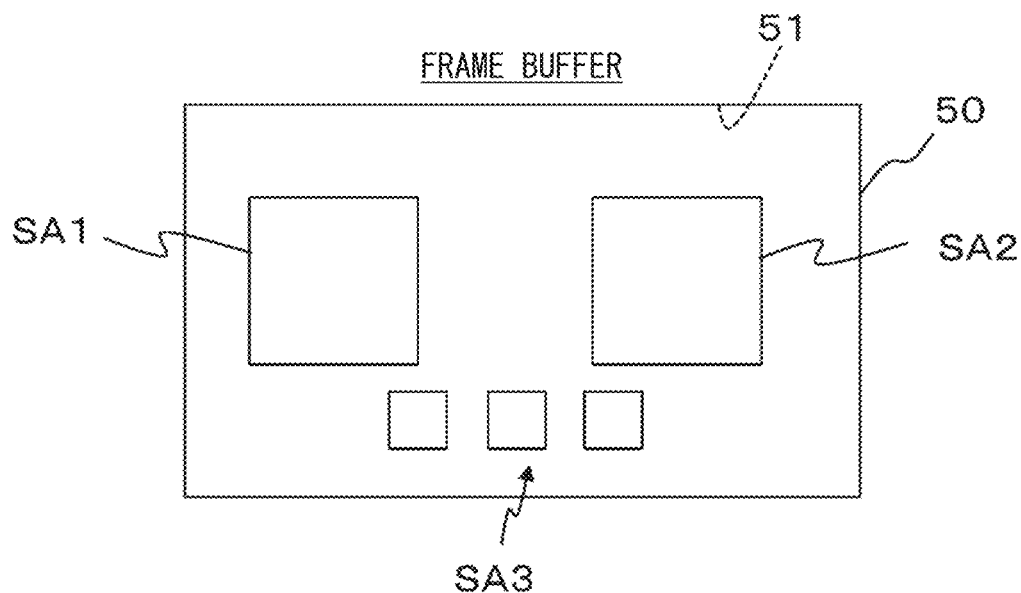
FIG. 25 is a diagram showing an example of specifying an arrangement region according to a sixth embodiment.

For example, the surfaces SA1 to SA3 drawn on the physical surface 30A are provided in a frame buffer 50 as shown in FIG. 25, and then output to the display device. The frame buffer 50 is obtained by combining the surfaces based on an XY two-dimensional coordinate system. Therefore, by displaying the surface provided in the frame buffer, contents are visually recognizable to the user. The frame buffer 50 is provided on, for example, a main memory. The frame buffer 50 is provided as an individual region in each display device.

As shown in FIG. 17 in the fourth embodiment, when the surface is shared across the CPU module 16 and the OS 20, the bus load is generated to synchronize the caches 17. In other words, it is considered that the write-back to the main memory 12 and the snoop to the cache 17 are not necessary for the surfaces that are not across the CPU module 16 and the OS 20.

Therefore, in the vehicular device 1, unnecessary write-back and snoop are prevented from occurring in the following manner. Specifically, the vehicular device 1 executes the region arrangement processing shown in FIG. 26, and specifies, for example, a shared region 51 shown in FIG. 25 in step S21. In the case of FIG. 25, the vehicular device 1 specifies the entire frame buffer 50 as the shared region 51. The specification is executed by the CPU module 16 in the present embodiment.

Figure 26:
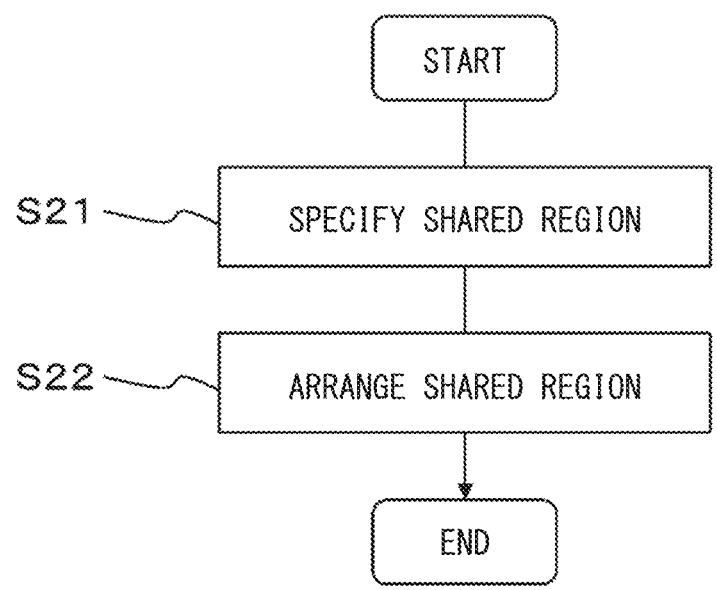
FIG. 26 is a diagram showing a flow of region arrangement processing.

Then, in step S22 in FIG. 26, the vehicular device 1 synchronizes the identified shared region 51. In this case, the vehicular device 1 is provided in the main memory 12 assuming that the entire frame buffer 50 is shared by the multiple CPU modules 16. Accordingly, the entire frame buffer 50 can be shared.

The arrangement is performed by the CPU module 16 and a GPU 13. That is, the CPU module 16 and the GPU 13 constitute an arrangement unit. More specifically, the CPU module 16, the OS 20, the application 21, the GPU 13 that receives an instruction from a CPU module 16 side, or the like can constitute the arrangement unit.

Accordingly, with respect to the arrangement in the frame buffer 50, write-back or snoop to another CPU module 16 side is not executed. Therefore, an unnecessary bus load can be prevented from being generated. Therefore, the load on the cache memory and the bus can be reduced.

According to the vehicular device 1 and the control method described above, following effects can be attained. The vehicular device 1 includes multiple CPU modules 16, the cache 17 allocated to the multiple CPU modules 16, the CPU module 16 serving as a specifying unit that specifies a shared region 51 shared by the multiple CPU modules 16, and the CPU module 16 and the GPU 13 serving as an region arrangement unit that arranges the shared region 51 specified by the specifying unit in the main memory 12.

Accordingly, although write-back or snoop occurs in the shared region 51 that needs to be shared, write-back or snoop does not occur in the region that does not need to be shared, and it is possible to prevent an unnecessary bus load from occurring.

In the vehicular device 1 including the multiple CPU modules 16, the load on the cache memory and the bus can be reduced according to a control method including processing of specifying the shared region 51 shared by the multiple CPU modules 16 and processing of providing the specified shared region 51 in the main memory 12.

The vehicular device 1 specifies the entire frame buffer 50 as the shared region 51. Accordingly, all surfaces necessary for providing the user interface can be shared.

When a user interface is provided, it may not be necessary to always update an entire screen. It is considered that the bus load can be further reduced by not sharing a part of the screen which does not need to be updated.

Figure 27:
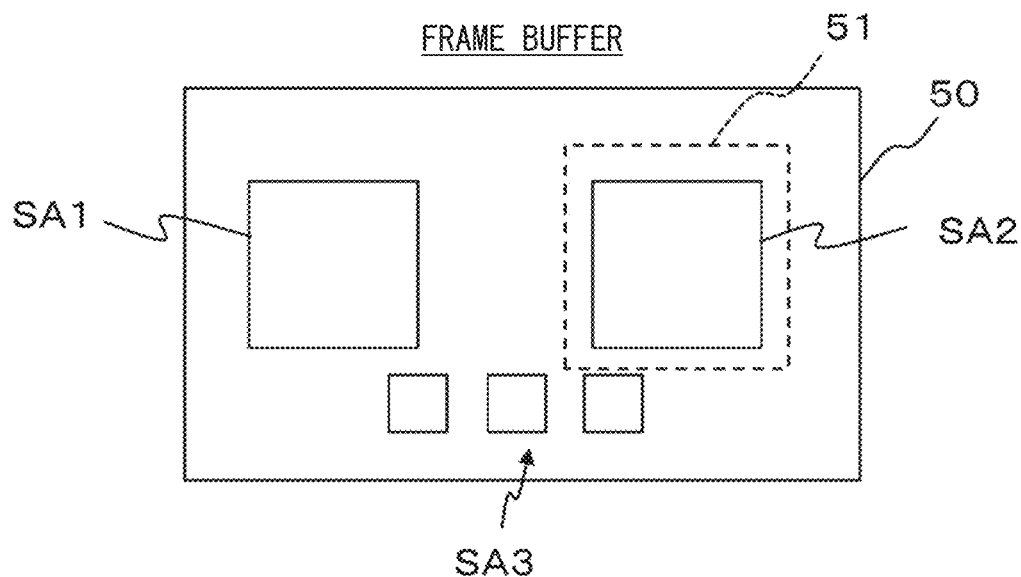
FIG. 27 is a first diagram showing an example of specifying another arrangement region.

Therefore, for example, as shown in FIG. 27, the vehicular device 1 can specify a part of the frame buffer 50 as the shared region 51. In this case, the vehicular device 1 can set a rectangular region in the frame buffer 50 and specifying the region as the shared region 51. Alternatively, the vehicular device 1 can set a region in the frame buffer 50 by a pixel map and specifying the region as the shared region 51. Even with such a configuration, unnecessary write-back and snoop can be reduced, and the load on the cache memory and the bus can be reduced.

Figure 28:
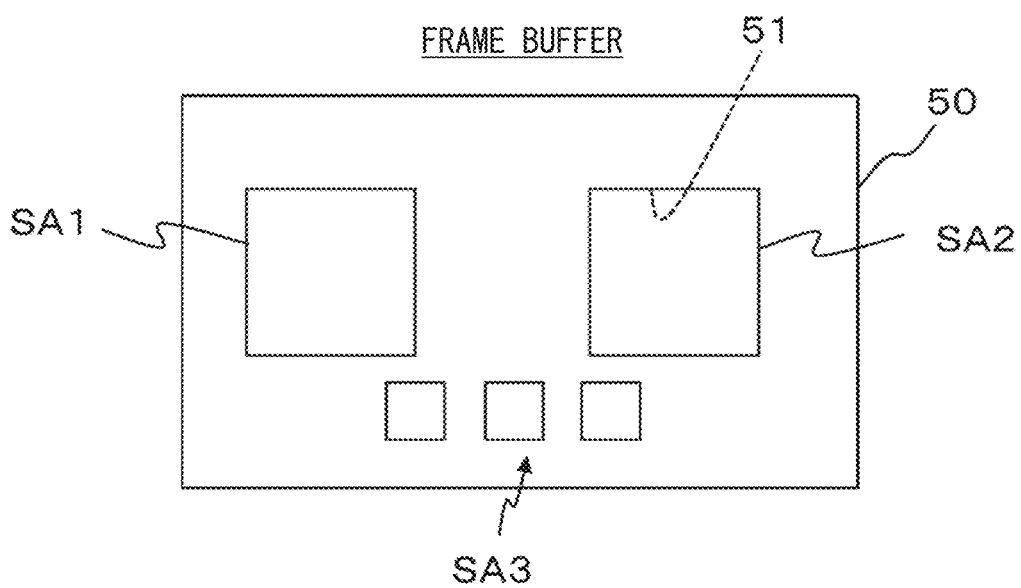
FIG. 28 is a second diagram showing an example of specifying another arrangement region.
Figure 29:
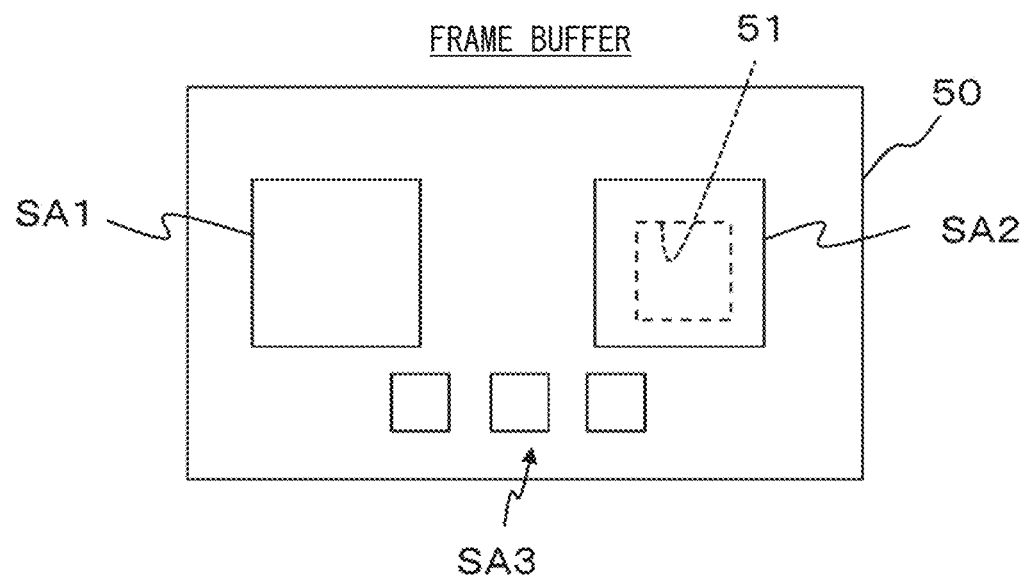
FIG. 29 is a third diagram showing an example of specifying another arrangement region.
Figure 30:
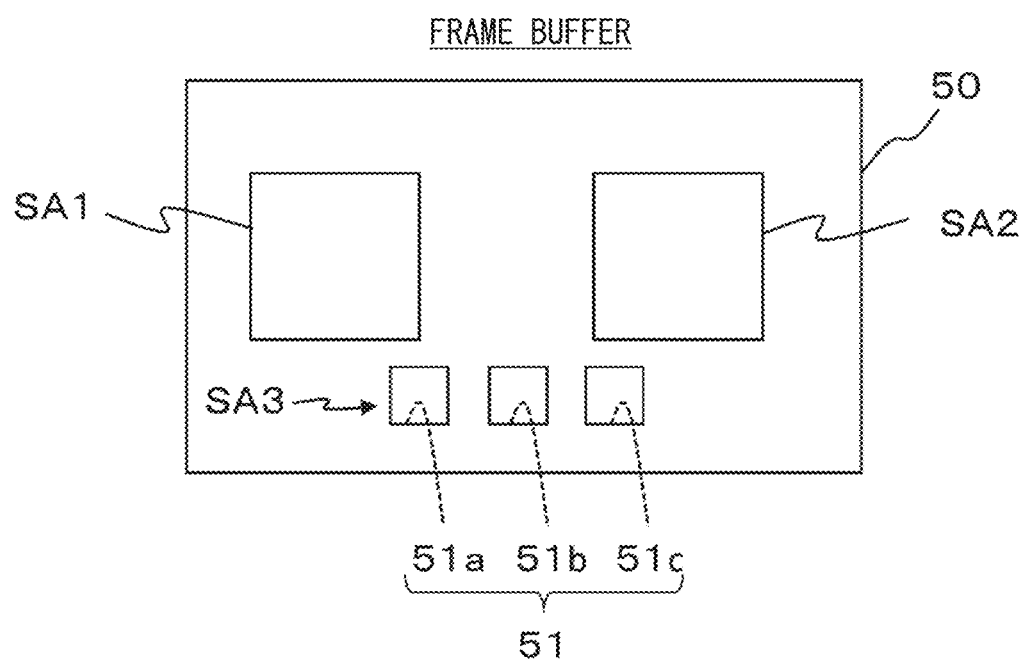
FIG. 30 is a fourth diagram showing an example of specifying another arrangement region.

For example, as shown in FIG. 28, the vehicular device 1 can specify one surface as the shared region 51. For example, as shown in FIG. 29, the vehicular device 1 can set a rectangular region in the surface and specifying the region as the shared region 51. For example, as shown in FIG. 30, the vehicular device 1 can set a region by a pixel map in the surface and specifying the region as the shared region 51. Even with such a configuration, unnecessary write-back and snoop can be reduced, and the load on the cache memory and the bus can be reduced.

The configuration and method according to the sixth embodiment can be adopted in combination with the configurations and methods according to the fourth embodiment and the fifth embodiment described above. That is, the configuration of reducing the bus load itself according to the present embodiment and the configuration of distributing the bus load described above can be combined with each other.

Although the present disclosure has been made in accordance with the embodiments, it is understood that the present disclosure is not limited to such embodiments and structures. The present disclosure also includes various modifications and modifications within an equivalent range. In addition, various combinations and forms, and further, other combinations and forms including only one element, or more or less than these elements are also within the sprit and the scope of the present disclosure.

Control units and methods described in the present disclosure may be implemented by a special purpose computer which is configured with a memory and a processor programmed to execute one or more particular functions embodied in computer programs of the memory. Alternatively, the control unit and the method according to the present disclosure may be achieved by a dedicated computer which is configured with a processor with one or more dedicated hardware logic circuits. Alternatively, the control unit and the method according to the present disclosure may be achieved using one or more dedicated computers which is configured by a combination of a processor and a memory programmed to execute one or more functions and a processor with one or more hardware logic circuits. Further, the computer program may store a computer-readable non-transitional tangible recording medium as an instruction to be performed by the computer.

What is claimed is:

1. A vehicular device comprising:
   a plurality of central processing unit (CPU) modules;
   a plurality of cache memories allocated to the plurality of CPU modules, respectively; and
   a memory synchronization unit configured to synchronize a plurality of surfaces drawn in the plurality of cache memories, respectively, wherein
   the memory synchronization unit is further configured to:
      divide each of the plurality of surfaces to be synchronized into a plurality of tiles; and
      sequentially synchronize the plurality of tiles from tiles for which drawing has been completed.

2. The vehicular device according to claim 1, further comprising
   a main memory configured to store a surface shared by the plurality of CPU modules, wherein
   each of the plurality of cache memories is configured to store another surface used by only one of the plurality of CPU modules.

3. The vehicular device according to claim 1, wherein
   the memory synchronization unit is further configured to sequentially synchronize the plurality of tiles along a route in which each of the plurality of tiles is not repeated.

4. The vehicular device according to claim 1, wherein
   the plurality of CPU modules is configured to execute a plurality of operating systems, respectively.

5. The vehicular device according to claim 1, wherein
   the vehicular device is configured to control display of a plurality of display devices.

6. A control method for synchronizing a plurality of cache memories included in a vehicular device, comprising:
   dividing a plurality of surfaces into a plurality of tiles, the plurality of surfaces drawn in the plurality of cache memories allocated to a plurality of central processing unit (CPU) modules, respectively; and
   sequentially synchronize the plurality of tiles from tiles for which drawing has been completed.

7. The vehicular device according to claim 1, wherein
   the memory synchronization unit is implemented by the plurality of CPU modules and a graphics processing unit.

* * * * *